US012044049B2

(12) United States Patent
Nakasone

(10) Patent No.: US 12,044,049 B2
(45) Date of Patent: Jul. 23, 2024

(54) LOCK DEVICE FOR OPENING/CLOSING BODY

(71) Applicant: PIOLAX, INC., Kanagawa (JP)

(72) Inventor: Hisashi Nakasone, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 316 days.

(21) Appl. No.: 17/285,319

(22) PCT Filed: Oct. 15, 2019

(86) PCT No.: PCT/JP2019/040412
§ 371 (c)(1),
(2) Date: Apr. 14, 2021

(87) PCT Pub. No.: WO2020/080343
PCT Pub. Date: Apr. 23, 2020

(65) Prior Publication Data

US 2021/0348427 A1 Nov. 11, 2021

(30) Foreign Application Priority Data

Oct. 18, 2018 (JP) ................................ 2018-196671

(51) Int. Cl.
*E05C 9/04* (2006.01)
*E05B 79/06* (2014.01)
(Continued)

(52) U.S. Cl.
CPC .............. *E05C 9/043* (2013.01); *E05B 79/06* (2013.01); *E05B 83/30* (2013.01); *E05B 85/10* (2013.01)

(58) Field of Classification Search
CPC ............. Y10T 292/0844; Y10T 292/57; Y10T 292/0894; E05C 9/043; E05C 9/16;
(Continued)

(56) References Cited

U.S. PATENT DOCUMENTS 4,343,501 A * 8/1982 Meeks .................... E05B 85/12
292/DIG. 31
6,474,703 B1 * 11/2002 Berg ....................... E05C 1/145
292/336.3
(Continued)

FOREIGN PATENT DOCUMENTS

CA 2342381 A1 * 10/2001 ............. E05B 77/26
CN 111827808 A * 10/2020 ............... B60R 7/04
(Continued)

OTHER PUBLICATIONS

Dec. 17, 2019, International Search Report issued for related PCT application No. PCT/JP2019/040412.
(Continued)

*Primary Examiner* — Kristina R Fulton
*Assistant Examiner* — Steven A Tullia
(74) *Attorney, Agent, or Firm* — Paratus Law Group, PLLC

(57) ABSTRACT

A lock device includes an operation member which includes a base end portion rotationally supported to a rotation support portion and a gripping part provided on a tip end-side, and is configured to slide a lock member in a direction of not engaging with a lock portion by rotating the gripping part in a direction of separating from the base member. One end-side of the base member located on the gripping part-side of the operation member is provided with a hook configured to be engaged with a peripheral edge on a rear side of one end-side of the attachment hole. The base member is provided with an elastically deformable elastic engaging claw configured to be engaged with the peripheral edge on the rear side of the attachment hole on the further other end-side opposite to the one end-side than the rotation support portion.

3 Claims, 19 Drawing Sheets

(51) Int. Cl.
*E05B 83/30* (2014.01)
*E05B 85/10* (2014.01)

(58) Field of Classification Search
CPC .......... E05C 19/06; E05B 83/30; E05B 85/10; E05B 79/06; E05B 79/00; E05B 83/28; E05B 83/32; E05B 85/12; E05B 85/14; E05B 85/16; E05B 85/18; E05B 1/00; E05B 5/00; E05B 7/00; Y10S 292/38; Y10S 292/53
See application file for complete search history.

(56) References Cited

U.S. PATENT DOCUMENTS

| | | | | |
|---|---|---|---|---|
| 8,123,183 | B2 * | 2/2012 | Ramsauer | E05B 9/08 248/222.51 |
| 10,486,607 | B2 * | 11/2019 | Harima | B60R 7/06 |
| 2014/0150505 | A1 * | 6/2014 | Shimizu | E05C 9/043 70/344 |
| 2017/0009497 | A1 | 1/2017 | Nakasone | |
| 2017/0044803 | A1 | 2/2017 | Nakasone | |
| 2018/0298649 | A1 * | 10/2018 | Nakasone | B60R 7/06 |
| 2021/0140204 | A1 * | 5/2021 | Minnich | E05B 5/00 |

FOREIGN PATENT DOCUMENTS

| | | | | |
|---|---|---|---|---|
| DE | 102017201971 | A1 * | 8/2018 | B60N 2/753 |
| EP | 3725987 | A1 * | 10/2020 | B60R 7/04 |
| JP | 2006-104771 | A | 4/2006 | |
| JP | 2015-021328 | A | 2/2015 | |
| JP | 6291028 | B2 | 3/2018 | |
| KR | 20150011030 | A * | 6/2013 | E05B 83/30 |
| KR | 20190054485 | A * | 11/2017 | E05B 83/28 |
| WO | WO-0175255 | A1 * | 10/2001 | E05B 77/38 |
| WO | WO-0238894 | A1 * | 5/2002 | E05B 1/0092 |
| WO | WO-2006032403 | A1 * | 3/2006 | E05B 1/0015 |
| WO | WO-2013018496 | A1 * | 2/2013 | E05B 13/10 |
| WO | WO-2015125774 | A1 * | 8/2015 | E05B 83/30 |
| WO | WO-2019195303 | A2 * | 10/2019 | E05B 13/10 |

OTHER PUBLICATIONS

Dec. 17, 2019, International Search Opinion issued for related PCT application No. PCT/JP2019/040412.
Dec. 17, 2019, International Preliminary Report on Patentability issued for related PCT application No. PCT/JP2019/040412.
Sep. 22, 2022, Indian Examination Report issued for related IN Application No. 202147017347.

* cited by examiner

LOCK DEVICE FOR OPENING/CLOSING BODY

CROSS REFERENCE TO PRIOR APPLICATION

This application is a National Stage Patent Application of PCT International Patent Application No. PCT/JP2019/040412 (filed on Oct. 15, 2019) under 35 U.S.C. § 371, which claims priority to Japanese Patent Application No. 2018-196671 (filed on Oct. 18, 2018), which are all hereby incorporated by reference in their entirety.

TECHNICAL FIELD

The present invention relates to a lock device for an opening and closing body for locking, in a closed state, an opening and closing body that is attached to an opening portion of a fixed body in an openable and closable manner.

BACKGROUND ART

For example, an opening and closing body such as a lid is attached to an opening portion formed in a fixed body such as a glove compartment of an automobile, in an openable and closable manner. A lock device that is locked when the opening and closing body is closed and can be unlocked when opening the opening and closing body is provided between the opening portion and the opening and closing body.

As the lock device of the related art, PTL 1 discloses a lock device including a drive member attached to an opening and closing member provided to an opening portion of an attached member in an openable and closable manner, capable of holding the opening and closing member in a locked state and connecting to a lock member, an operation member configured to rotationally drive the drive member, and a base member configured to rotatably support the drive member. The base member has a box-shaped main body part, and a hook-shaped attaching hooking portion that is hooked to a peripheral edge on a rear side of an attachment opening of the opening and closing member protrudes from one end on a rear side of the base member. Rotation support portions protrude from both side surfaces of the main body part, and the handle-type operation member is rotatably supported to come close to or separate from the base member. Engaging claw portions configured to engage to the peripheral edge on the rear side of the attachment opening are formed to be flexible between the attaching hooking portion and the rotation support portions on both side surfaces of the main body part. When the operation member is rotated in a direction of separating from the base member, a transmission part provided to the operation member rotationally drives the rotor-type drive member to slide the lock member. Thereby, the lock member is separated from an engaging hole portion of a glove compartment, so that the opening and closing body can be opened. Note that, when attaching the base member to the attachment opening of the opening and closing member, the base member is obliquely inserted from a front side of the attachment opening to cause the hook-shaped attaching hooking portion to be hooked to the peripheral edge on the rear side of one end portion of the attachment opening. Then, the base member is pushed to cause the flexible engaging claw portions to engage to the peripheral edge on the rear side of both side parts of the attachment opening, so that the base member can be attached to the attachment opening.

CITATION LIST

Patent Literature

PTL 1: Japanese Patent No. 6291028 B

SUMMARY OF INVENTION

Technical Problem

In the lock device of PTL 1, when the operation member is rotated in a direction of separating from the base member so as to unlock the opening and closing body, a pulling load is applied to the base member via the rotation support portion. At this time, a rotation moment is applied to the base member with the hook-shaped attaching hooking portion as a support point hooked to the peripheral edge on the rear side of one end portion of the attachment opening. At this time, since the flexible engaging claw portions of the base member are provided between the attaching hooking portion and the rotation support portions on both side surfaces of the main body part and are close to the hook-shaped attaching hooking portion, as described above, the engaging claw portions are susceptible to the rotation moment, and thus may rattle with respect to the attachment opening.

It is therefore an object of the present invention to provide a lock device for an opening and closing body capable of enabling a base member to be attached from a front side of an attachment hole and making it difficult for the base member to rattle with respect to the attachment hole when rotating an operation member so as to unlock an opening and closing body.

Solution to Problem

In order to achieve the above object, the present invention provides a lock device for an opening and closing body that is attached to an opening portion of a fixed body in an operable and closable manner, the lock device including a lock portion provided on the opening portion of the fixed body or the opening and closing body; a lock member configured to operate via an operation member to be thus engaged with or disengaged from the lock portion; an attachment hole formed on a front side of the opening and closing body or the fixed body; and a base member inserted and attached from a front side of the attachment hole and including a rotation support portion rotationally supporting the operation member, wherein the operation member includes a base end portion rotationally supported to the rotation support portion and a gripping part provided on a tip end-side and is configured to slide the lock member in a direction of not engaging with the lock portion by rotating the gripping part in a direction of separating from the base member, one end-side of the base member located on the gripping part-side of the operation member is provided with a hook configured to be engaged with a peripheral edge on a rear side of one end-side of the attachment hole, and the base member is provided with an elastically deformable elastic engaging claw configured to be engaged with the peripheral edge on the rear side of the attachment hole on the further other end-side opposite to the one end-side than the rotation support portion.

Advantageous Effects Of Invention

According to the present invention, when attaching the base member to the attachment hole, the base member is obliquely inserted from the front side of the attachment hole to engage the hook provided on one end-side of the base member to the peripheral edge on the rear side on one end-side of the attachment hole. Then, the other end-side of the base member is pushed toward the attachment hole, so that the elastic engaging claw is pressed against an inner periphery of the attachment hole and is inserted while being bent. Then, the elastic engaging claw is engaged with the peripheral edge on the rear side of the attachment hole, so that the base member can be attached to the attachment hole.

When the gripping part of the operation member is rotated in a direction of separating from the base member so as to unlock the opening and closing body, a pulling load of pulling the base member from the attachment hole is applied to the base member via the operation member. The pulling load is applied to the base member with the hook as a support point, as rotation moment in a pulling direction. However, in the lock device, since the elastic engaging claw is provided at a position distant from the hook, it is possible to make it difficult for the elastic engaging claw to be susceptible to the rotation moment, so that it is possible to suppress rattling of the elastic engaging claw with respect to the attachment hole. As a result, the base member can be stably attached to the attachment hole.

DESCRIPTION OF EMBODIMENTS

Hereinbelow, an embodiment of the lock device for an opening and closing body according to the present invention will be described.

Figure 1:
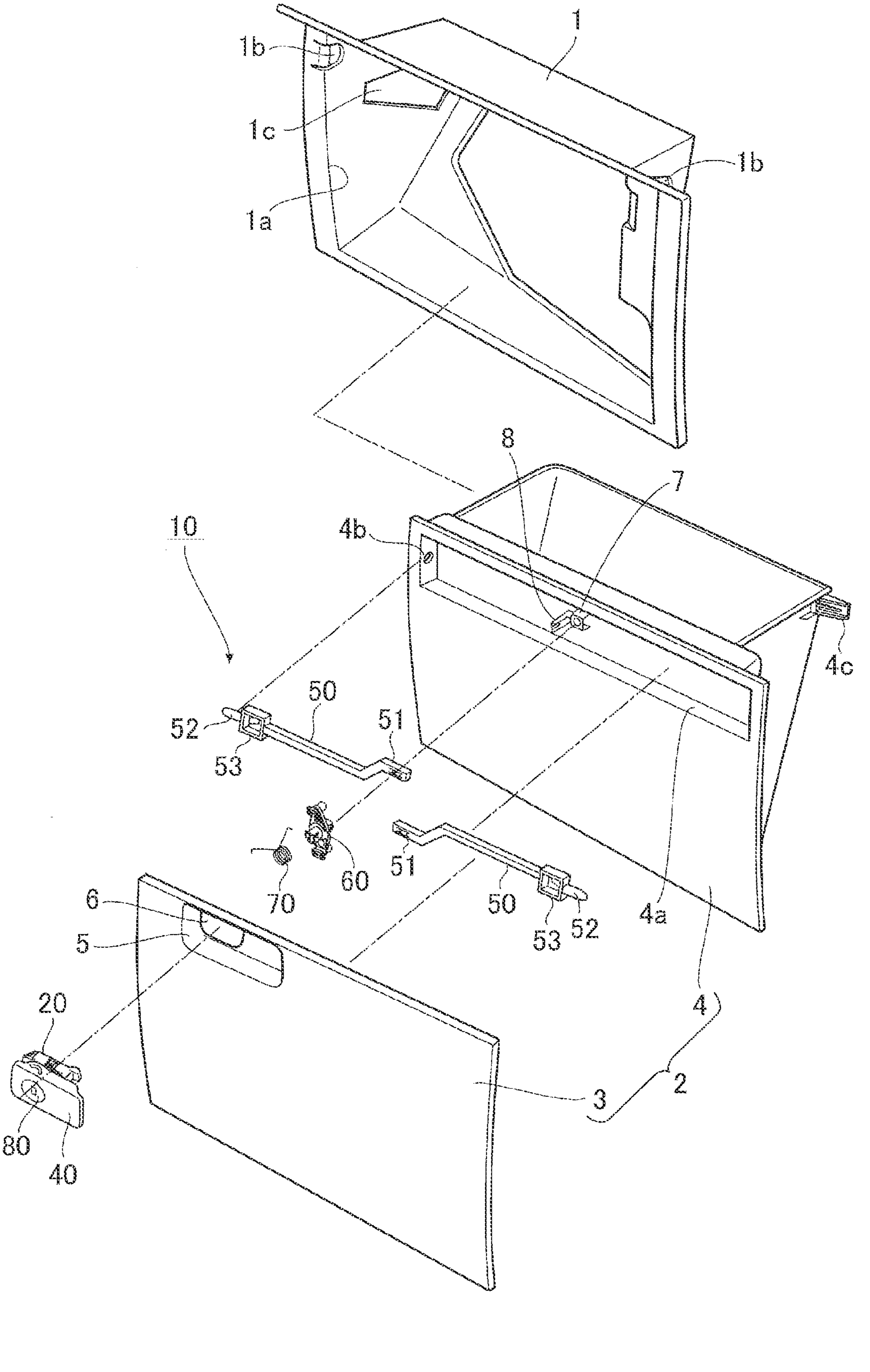
FIG. 1 is an exploded perspective view depicting an embodiment of the lock device for an opening and closing body of the present invention.
Figure 15:
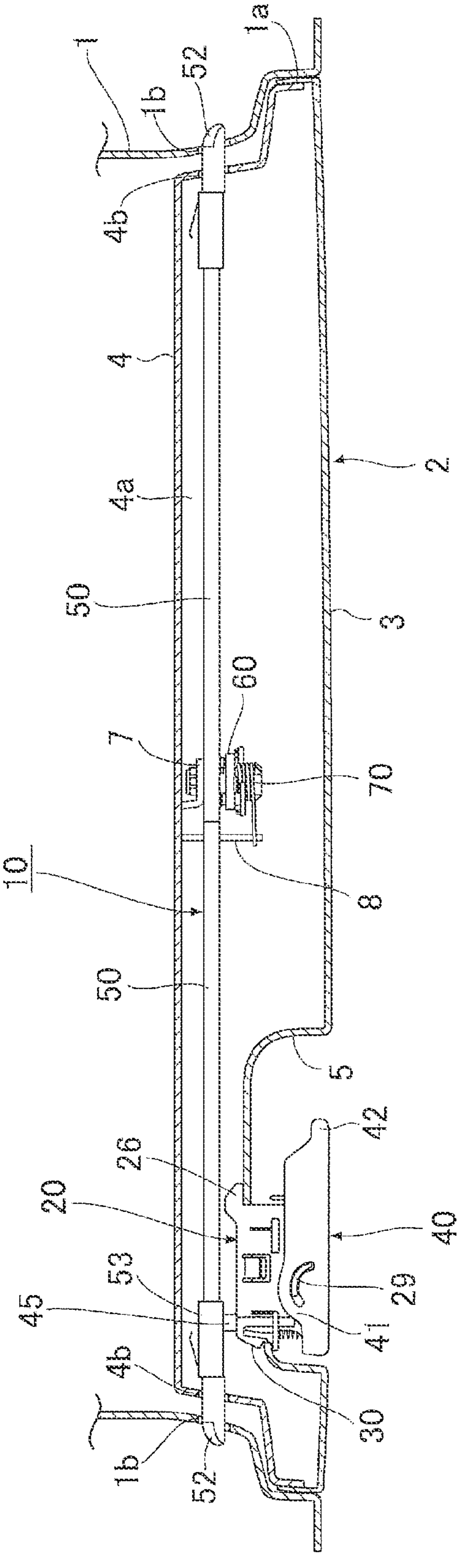
FIG. 15 is a plan view depicting a case where the opening and closing body is locked in a closed state in the lock device.

As shown in FIGS. 1 and 15, a lock device 10 for an opening and closing body (hereinbelow, referred to as "lock device 10") of the present embodiment is used, for example, for open/close-locking an opening and closing body 2 such as a glove compartment that is attached to an opening portion 1*a* of a fixed body 1 such as an instrument panel of a vehicle in an openable and closable manner.

The lock device 10 of the present embodiment includes an attachment hole 6 (refer to FIG. 10A) formed in the opening and closing body 2, a pair of lock portions 1*b* and 1*b* (refer to FIGS. 15 and 16) provided to the opening portion 1*a* of the fixed body 1, a base member 20 inserted and attached from a front side of the attachment hole 6, a pair of lock members 50 and 50 slidably arranged with respect to the opening and closing body 2 and configured to operate via the operation member 40 to be thus engaged with or disengaged from the lock portions 1*b* and 1*b*, a rotary member 60 configured to interlock slide operations of the pair of lock members 50 and 50, a first urging means 70 for urging each lock member 50 in a direction of engaging with the lock portion 1*b*, and an operation member 40 having a base end portion 41, which is rotatably attached to the base member 20 via a rotation support portion 29, and configured to slide the lock members 50 by causing a gripping part 42 to come close to or to separate from the base member 20.

Note that, in the present embodiment, the attachment hole 6 is formed in the opening and closing body 2, and the lock members 50 are slidably arranged with respect to the opening and closing body 2. However, the attachment hole may be formed in the fixed body, and the lock members may be slidably arranged with respect to the fixed body-side.

Figure 2:
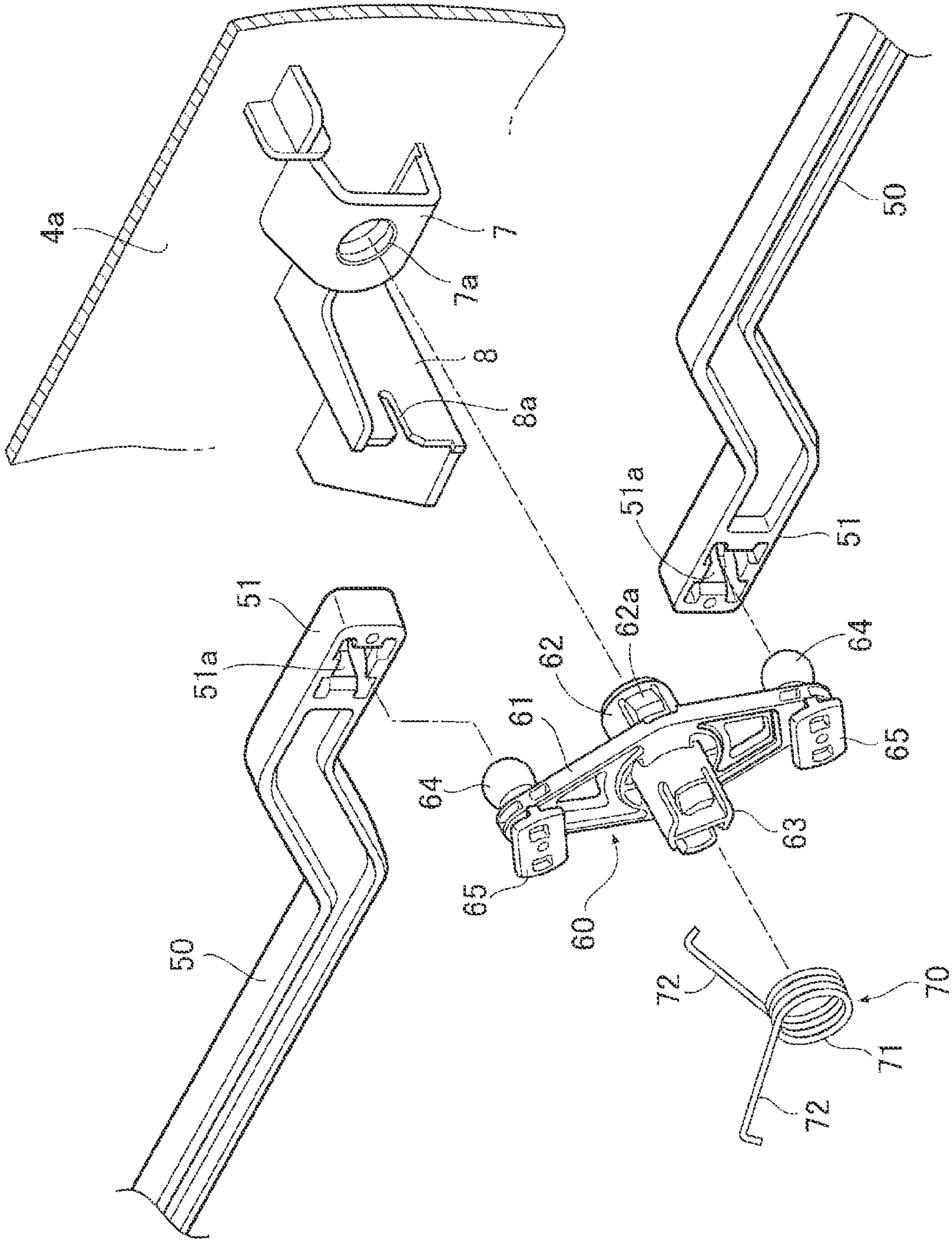
FIG. 2 is an exploded perspective view depicting a state before attaching a rotary member, a lock member and the like in the lock device.
Figure 10A:
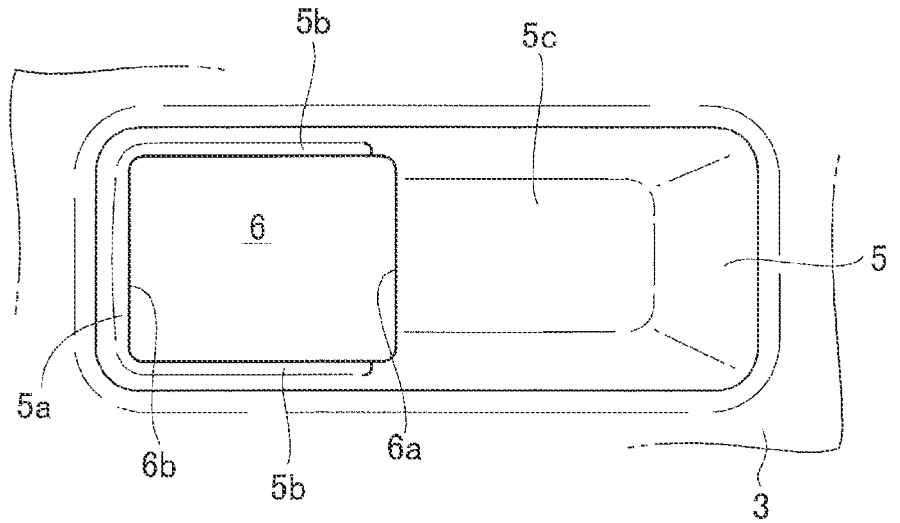
FIG. 10A is a plan view of a concave portion for accommodation.
Figure 10B:
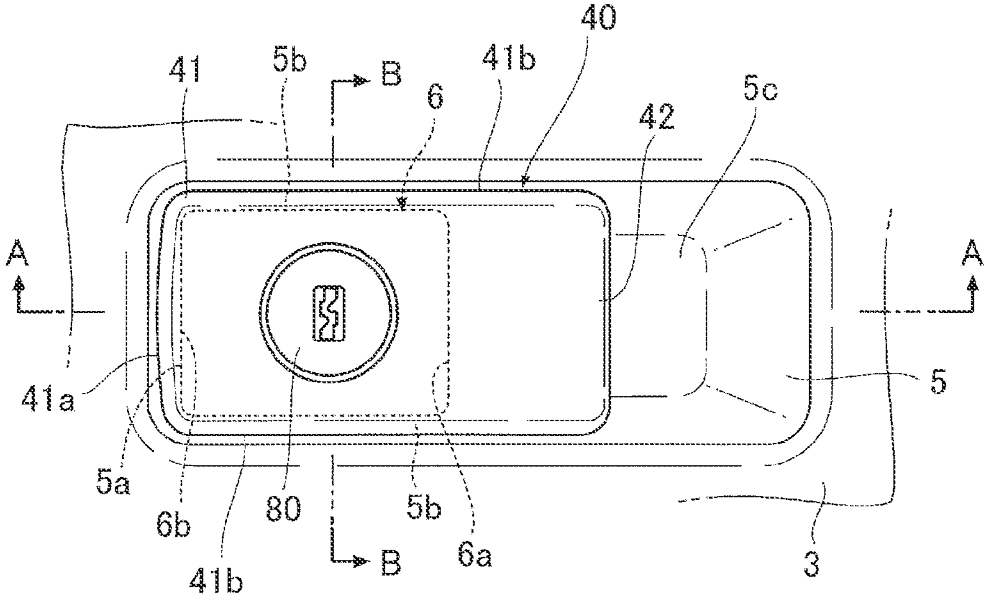
FIG. 10B is a plan view depicting a state where the base member and the operation member are arranged in the concave portion for accommodation.

In addition, as shown in FIG. 10B, a key cylinder 80 is arranged in the operation member 40, so that a locked state of the lock members 50 and 50 with respect to the lock portions 1*b* and 1*b* can be kept or released. Further, as shown in FIG. 2, in the present embodiment, the first urging means 70 is a torsion spring, and has a wound portion 71 and a pair of arm portions 72 and 72 extending from the wound portion 71, The first urging means 70 is mounted to the rotary member 60 and rotationally urges the same to urge the lock members 50 connected to the rotary member 60 in a direction of engaging with the lock portion 1*b* (refer to FIG. 17). However, the first urging means may be, for example, a tension spring that pulls one side of the lock member toward the lock portion and can urge the lock member in a direction of engaging with the lock portion.

Note that, as described above, the present embodiment is applied to, for example, a structure where the box-shaped glove compartment is rotatably attached to the opening portion of the instrument panel (in this case, the instrument panel is the "fixed body" and the glove compartment is the "opening and closing body") but may also be applied to a structure where a lid is attached to the opening portion of the instrument panel in an openable and closable manner (in this case, the instrument panel is the "fixed body", and the lid is the "opening and closing body") and can also be widely used for a variety of opening and closing bodies for opening and closing the opening portion of the fixed body.

As shown in FIGS. 1 and 15, in the present embodiment, the lock portions 1*b* and 1*b* each having a hole shape are provided on both inner surfaces of the opening portion 1*a* of the fixed body 1 in a width direction. Both side parts of the opening portion 1*a*, of the fixed body 1 are formed with opening and dosing body rotation grooves 1*c* and 1*c* (refer to FIG. 1). Note that, the lock portion may have a concave shape, a protrusion shape, a frame shape or the like, instead of the hole shape, and may also be provided to the opening and closing body, not the opening portion of the fixed body. That is, the lock portion is not particularly limited.

Figure 9:
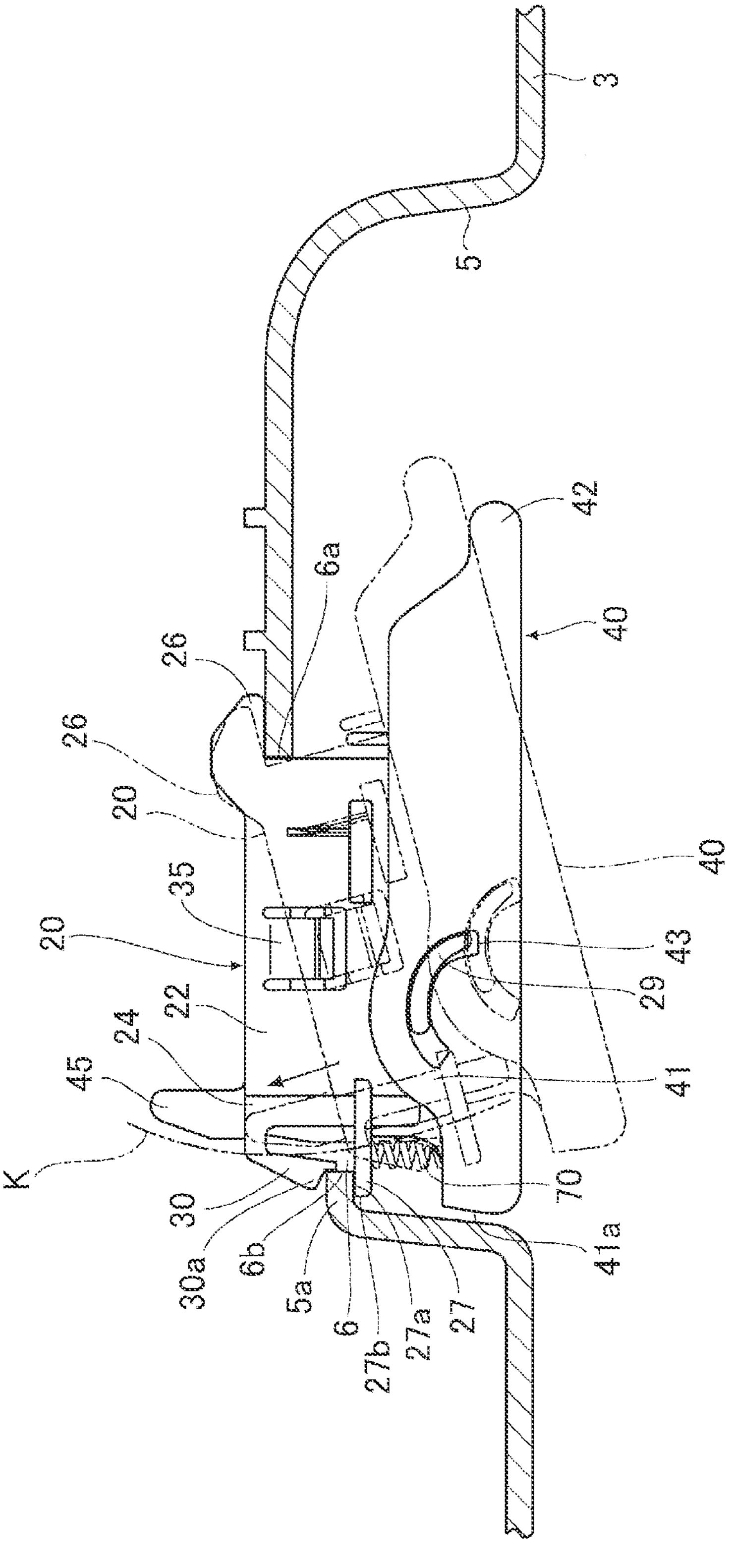
FIG. 9 illustrates a state at the time the base member is attached to an attachment hole in the lock device.
Figure 12:
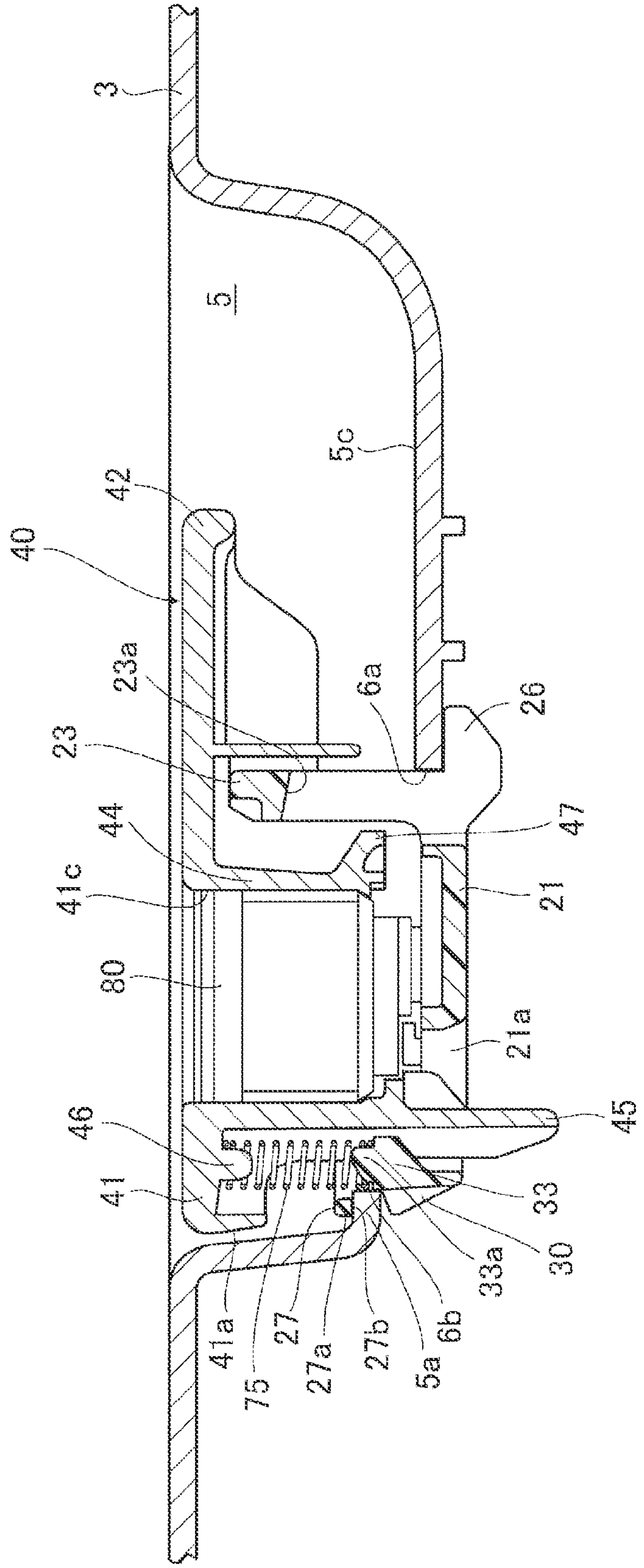
FIG. 12 is a sectional view taken along an A-A arrow of FIG. 10B.

As shown in FIG. 1, in the present embodiment, the opening and closing body 2 is constituted by an outer member 3 arranged on a vehicle interior inner side and an inner member 4 arranged on a rear side thereof. Note that, the opening and closing body may also be constituted by one plate, not the two members of the outer member 3 and the inner member 4. A concave portion 5 for accommodation having a horizontally long rectangular shape is formed above one side of the outer member 3 in the width direction. As shown in FIGS. 9 and 12, the operation member 40 is accommodated in the concave portion 5 for accommodation. In addition, one side part of the concave portion 5 for accommodation in a longitudinal direction is formed with an attachment hole 6 having a long hole shape and extending in the width direction of the opening and closing body 2 (refer to FIG. 10A).

The attachment hole 6 is formed in a bottom wall 5*c* of the concave portion 5 for accommodation. From an inner surface of the concave portion 5 for accommodation located on the base end portion 41-side of the operation member 40, protruding portions 5*a* and 5*b* protruding toward an inner side of the concave portion 5 for accommodation at positions higher than the bottom wall 5*c* are provided. As shown in FIG. 10A, in the present embodiment, the protruding portion 5*a* protrudes from an inner surface on one end-side of the concave portion 5 for accommodation in the longitudinal direction (the base end portion 41-side of the operation member 40), and a pair of protruding portions 5*b* and 5*b* orthogonal to the protruding portion 5*a* protrudes in parallel from inner surfaces of both sides orthogonal to the longitudinal direction of the concave portion 5 for accommodation and forms a substantially U-shape as a whole. Protruding end faces of the protruding portions 5*a*, 5*b* and 5*b* (end faces at the most protruding positions toward the inner side of the concave portion for accommodation) form inner peripheral edges of three sides of the attachment hole 6.

Note that, in the present embodiment, a portion of the attachment hole 6 facing the protruding portion 5*a* forms one end 6*a* of the attachment hole 6 in the longitudinal direction, Which corresponds to the "one end of the attachment hole" of the present invention. Note that, an end edge of the protruding portion 5*a* forms the other end 6*b* of the attachment hole 6 in the longitudinal direction, which corresponds to the "other end of the attachment hole" of the present invention. Note that, one end 6*a* of the attachment hole 6 is arranged at a position lower than the other end 6*b* of the attachment hole 6 (refer to FIG. 9). The attachment hole may not have the long hole shape, and may be a hole having a substantially square shape, a hole having a substantially elliptical shape, a hole having a substantially oval shape, or the like, for example. In this case, the "one end of the attachment hole" of the present invention means a part within a predetermined range of the inner periphery of the attachment hole, and the "other end of the attachment hole" of the present invention means a part of the inner periphery of the attachment hole facing the one end.

The base member 20 is inserted and attached from the front side of the attachment hole 6. As used herein, the "front side" or the "front surface side" means a surface located in a direction in which the opening and closing body is opened from the opening portion of the fixed body such as a vehicle. Note that, in a case where the fixed body is provided in a vehicle, a space side in the vehicle may be the "front side" or the "front surface side". The "rear side" or the "rear surface side" means a surface opposite to the "front side" or the "front surface side", i.e., a surface located in a direction in which the opening and closing body is closed. Note that, the "front side", the "front surface side", the "rear side" and the "rear surface side" have the similar meanings not only for the attachment hole but also for other members (the operation member 40 and the like) to be described later.

Figure 16:
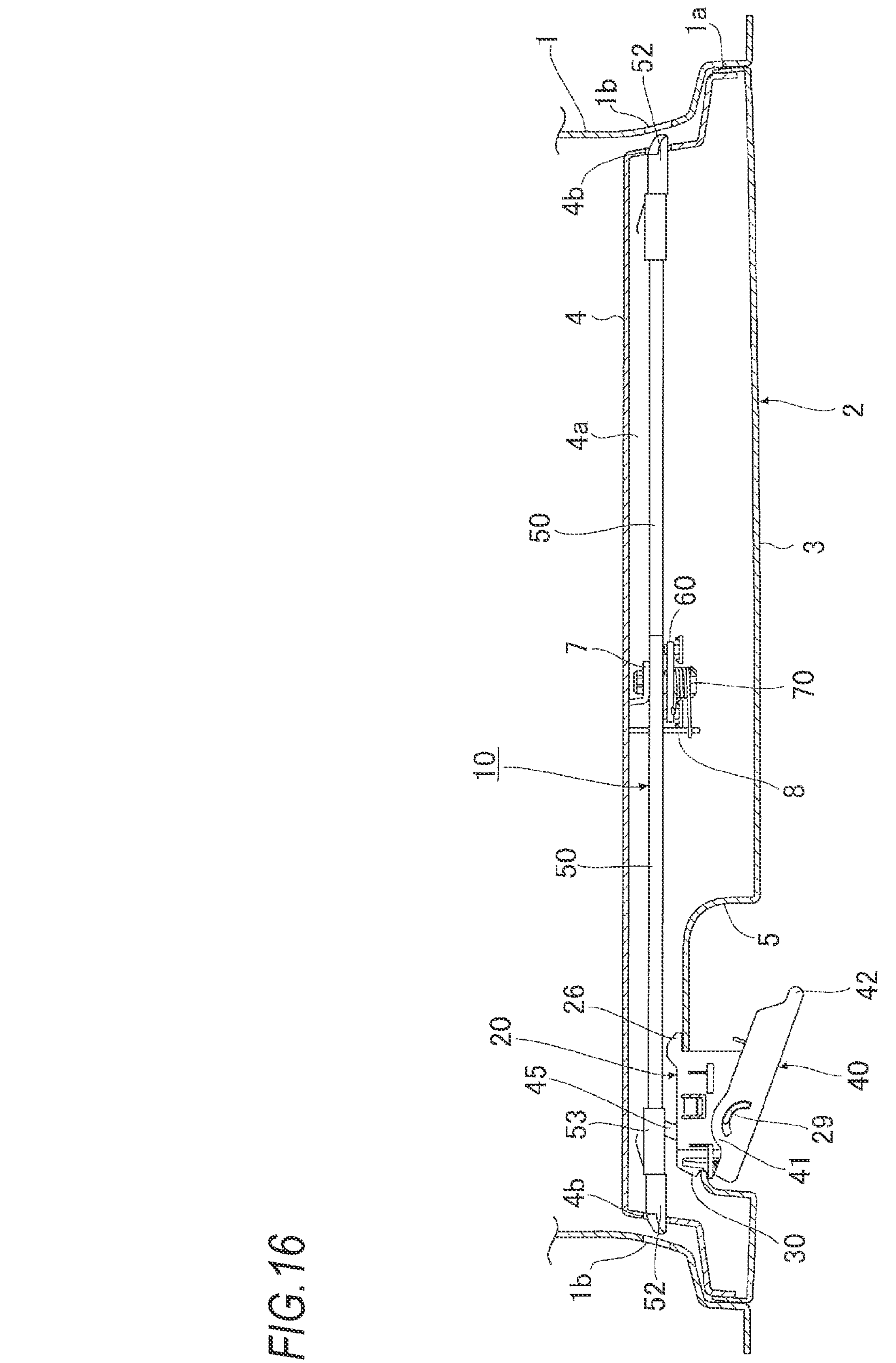
FIG. 16 is a plan view depicting a case where a locked state of the opening and closing body is released in the lock device.

As shown in FIG. 1, the inner member 4 has a box shape that is opened upward, as a whole. An upper part of a front surface side of the inner member 4 arranged to face the outer member 3 is provided with a concave portion 4*a* for lock arrangement having a horizontally long concave shape and configured to slidably arrange the pair of lock members 50 and 50. As shown in FIGS. 15 and 16, both sides of the concave portion 4*a* for lock arrangement in the longitudinal direction are each formed with each of holes 4*b* and 4*b* for lock insertion and extraction. Also, as shown in FIG. 1, stoppers 4*c* and 4*c* protrude from both side outer surfaces of an inner side of the inner member 4. The stoppers 4*c* and 4*c* are each inserted in the guide holes 1*c* and 1*c* of the fixed body 1, so that an opening/closing angle of the opening and closing body 2 with respect to the opening portion 1*a* of the fixed body 1 is regulated.

Figure 3:
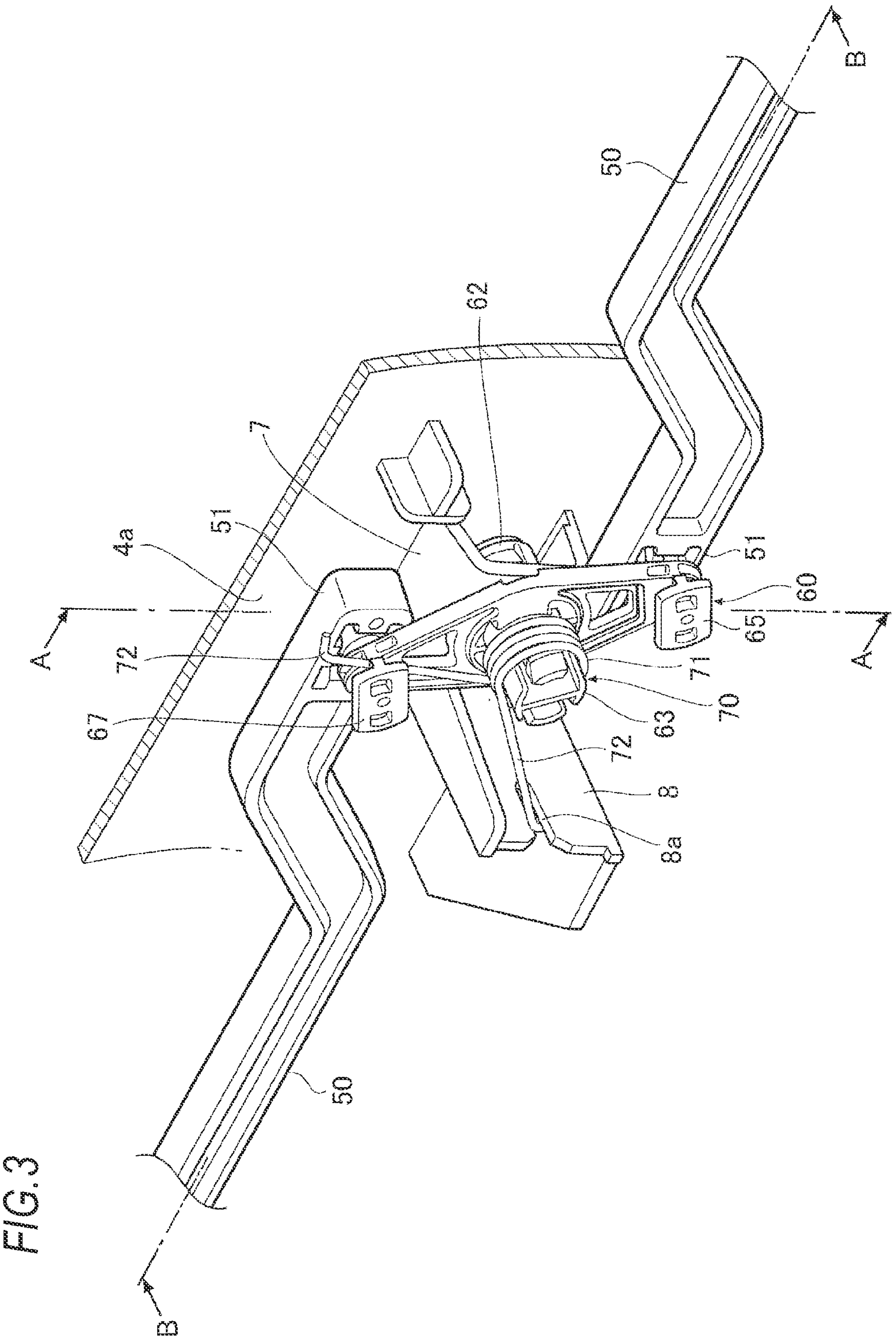
FIG. 3 is an enlarged perspective view depicting a state where the rotary member, the lock member and the like are attached in the lock device.

As shown in FIGS. 15 and 16, a rotary member support part 7 for rotationally supporting the rotary member 60 protrudes from a front surface side of a bottom surface of the concave portion 4*a* for lock arrangement. Referring to FIGS. 2 and 3, the rotary member support part 7 has a dog house-like box shape where a front surface side is opened, and a ceiling surface thereof is formed with a support hole 7*a* having a circular hole shape. A spring engaging wall 8 is erected at a position close to the rotary member support part 7. The spring engaging wall 8 is formed with an engaging groove 8*a*, and one arm portion 72 of the first urging means 70 is engaged with the engaging groove 8*a*.

Figure 8:
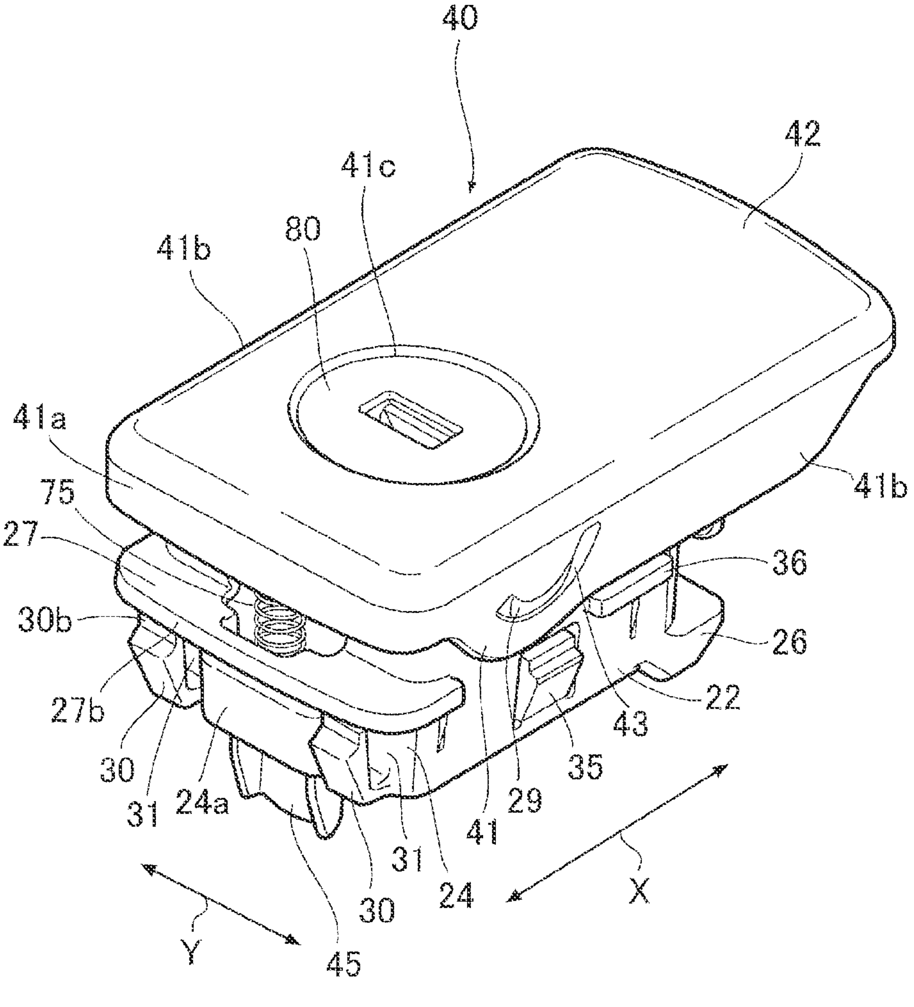
FIG. 8 is an enlarged perspective view depicting a state where the base member, the operation member and the like are attached in the lock device.

Also, as shown in FIGS. 1 and 2, the pair of lock members 50 and 50 of the present embodiment has the same shape where a base end portion 51-side is bent in a crank shape and extends linearly toward a tip end-side and a tip end portion 52 is adapted to engage with or disengage from the lock portion 1*b* (refer to FIGS. 15 to 18). Note that, as shown in FIG. 8, the base end portion 51 of the lock member 50 is provided with a concave portion 51*a* for fitting having a concave shape and a lock connecting portion 64 of the rotary member 60, which will be described later, is fitted in the concave portion 51*a* for fitting. A tip end-side of the lock member 50 is provided with a frame-shaped part 53 having a rectangular frame shape.

As shown in FIG. 2, the rotary member 60 has a main body 61 having a substantially rhombic shape, a substantially tubular rotation support portion 62 protruding from a center on a rear side of the main body 61, a substantially tubular spring mounting portion 63 protruding from a center on a front side of the main body 61, spherical lock connecting portions 64 and 64 protruding from both ends in the longitudinal direction on a rear side of the main body 61, and spring engaging pieces 65 and 65 protruding from both ends in the longitudinal direction on a front side of the main body 61. Flexible engaging pieces 62*a* and 62*a* are formed via slits on an outer periphery of the rotation support portion 62.

Each lock connecting portion 64 is fitted and connected in the concave portion 51*a* for fitting provided to the base end portion 51 of each lock member 50, so that the base end portions 51 of the pair of lock members 50 and 50 are rotatably connected to both end portions of the rotary member 60 in the longitudinal direction. The rotation support portion 62 is inserted into the support hole 7*a* of the rotary member support part 7, so that the engaging pieces 62*a* and 62*a* are engaged with a peripheral edge on a rear side of the support hole 7*a* and the rotary member 60 is thus rotatably supported to the rotation support portion 62 and is prevented from coming off from the rotation support portion 62 (refer to FIG. 3). The rotary member 60 is rotated in a predetermined direction, so that the pair of lock members 50 and 50 is slid in a synchronization manner via the rotary member 60.

The spring mounting portion 63 is inserted into the wound portion 71 of the first urging means 70, so that the first urging means 70 is mounted to the rotary member 60. Then, the other arm portion 72 of the first urging means 70 is engaged with one spring engaging piece 65, so that the rotary member 60 is rotationally urged, as shown with a direction of an arrow E1 in FIG. 17. Thereby, the tip end portions 52 and 52 of the pair of lock members 50 and 50 are urged in a direction of engaging with the pair of lock portions 1*b* and 1*b* (a direction of an arrow E2 in FIG. 17). Note that, as described above, the pair of lock members 50 and 50 is slidably arranged in the concave portion 4*a* for lock arrangement of the inner member 4 constituting the opening and closing body 2. However, the tip end portions 52 and 52 are inserted from the holes 4*b* and 4*b* for lock insertion and extraction provided to the concave portion 4*a* for lock arrangement.

Subsequently, the base member 20 that is inserted and attached from the front side of the attachment hole 6 and has the rotation support portion 29 rotationally supporting the operation member 40 is described.

Figure 4:
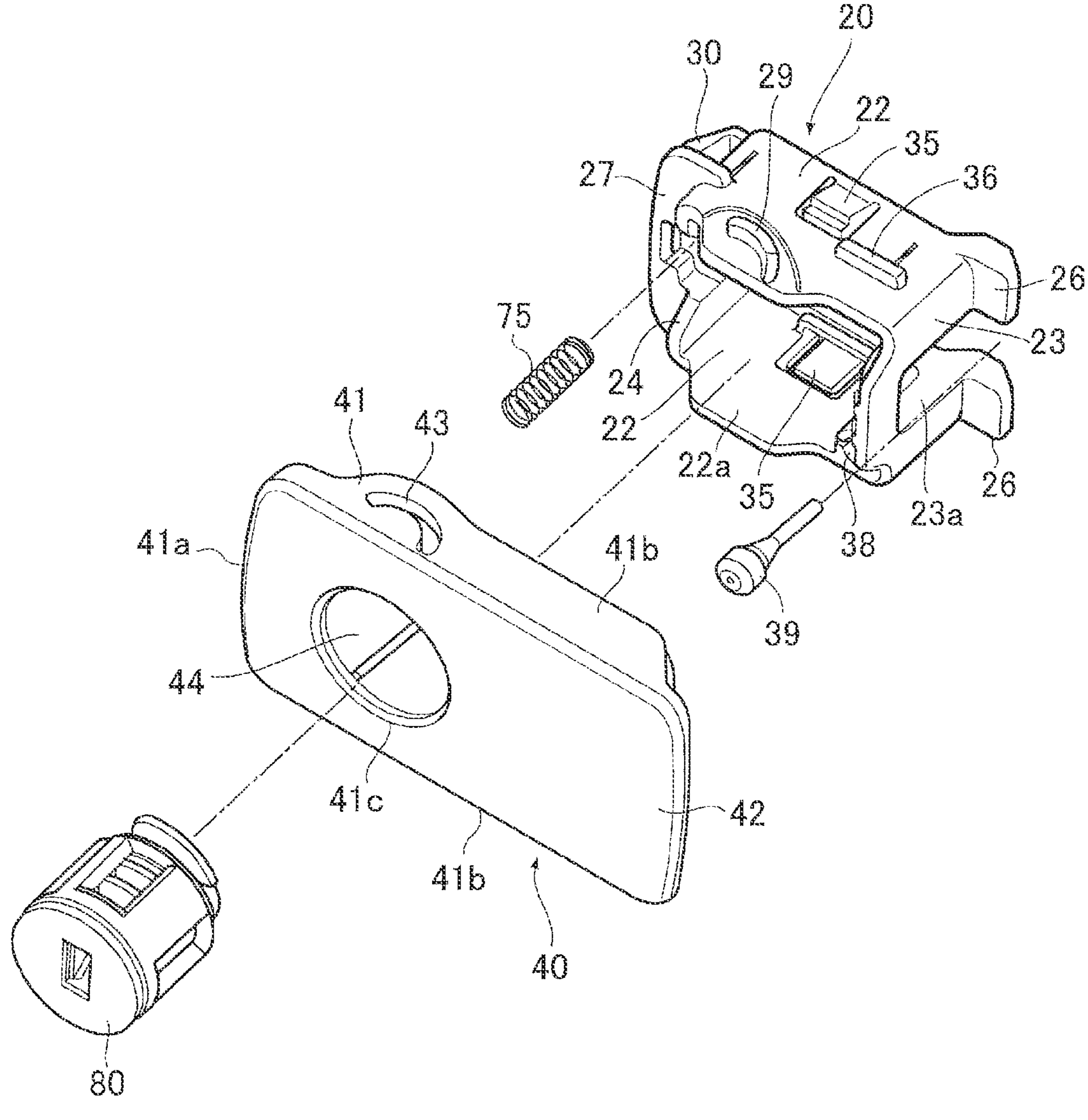
FIG. 4 is an exploded perspective view depicting a state before attaching a base member, an operation member and the like in the lock device.
Figure 5A:
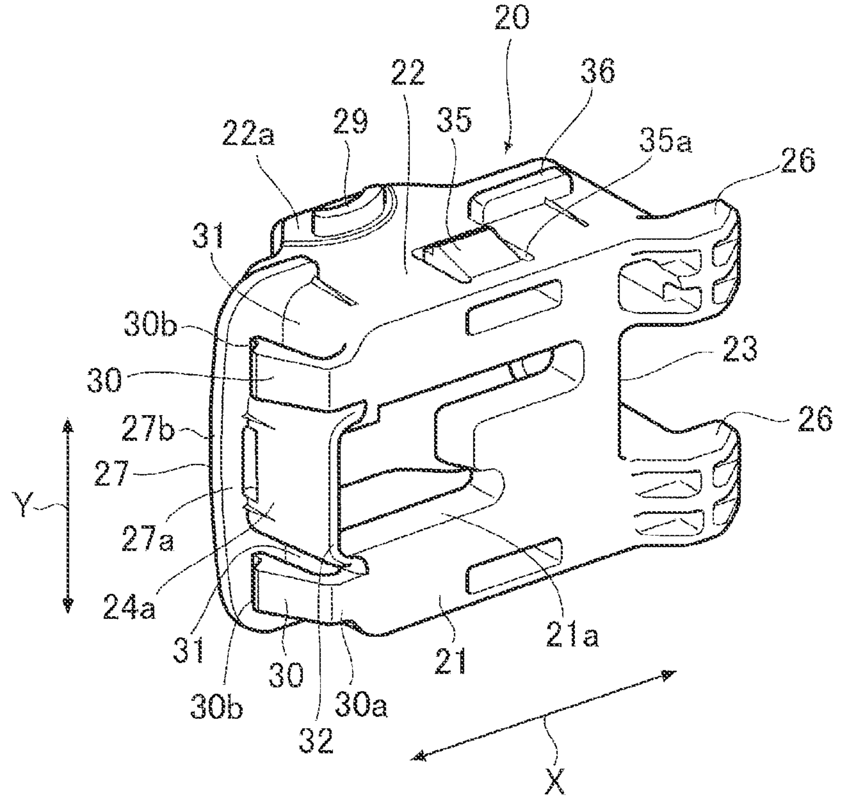
FIG. 5A is an enlarged perspective view of the base member.
Figure 5B:
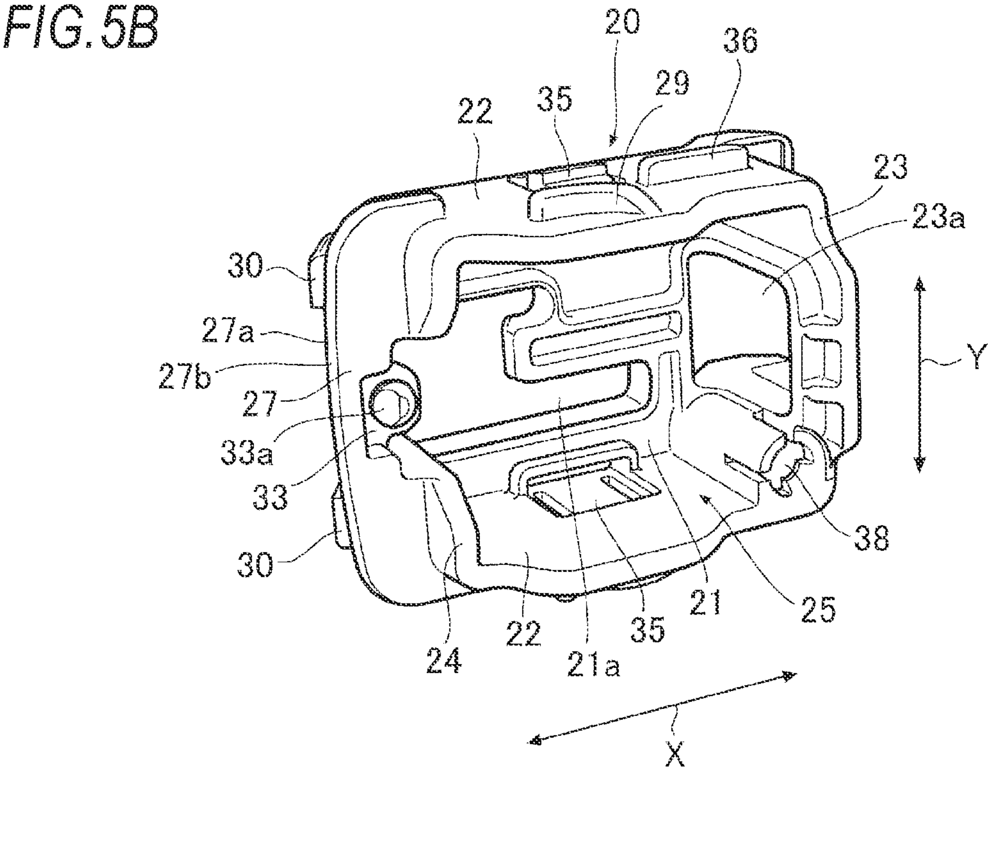
FIG. 5B is an enlarged perspective view of the base member, as seen in a direction different from FIG. 5A.
Figure 6:
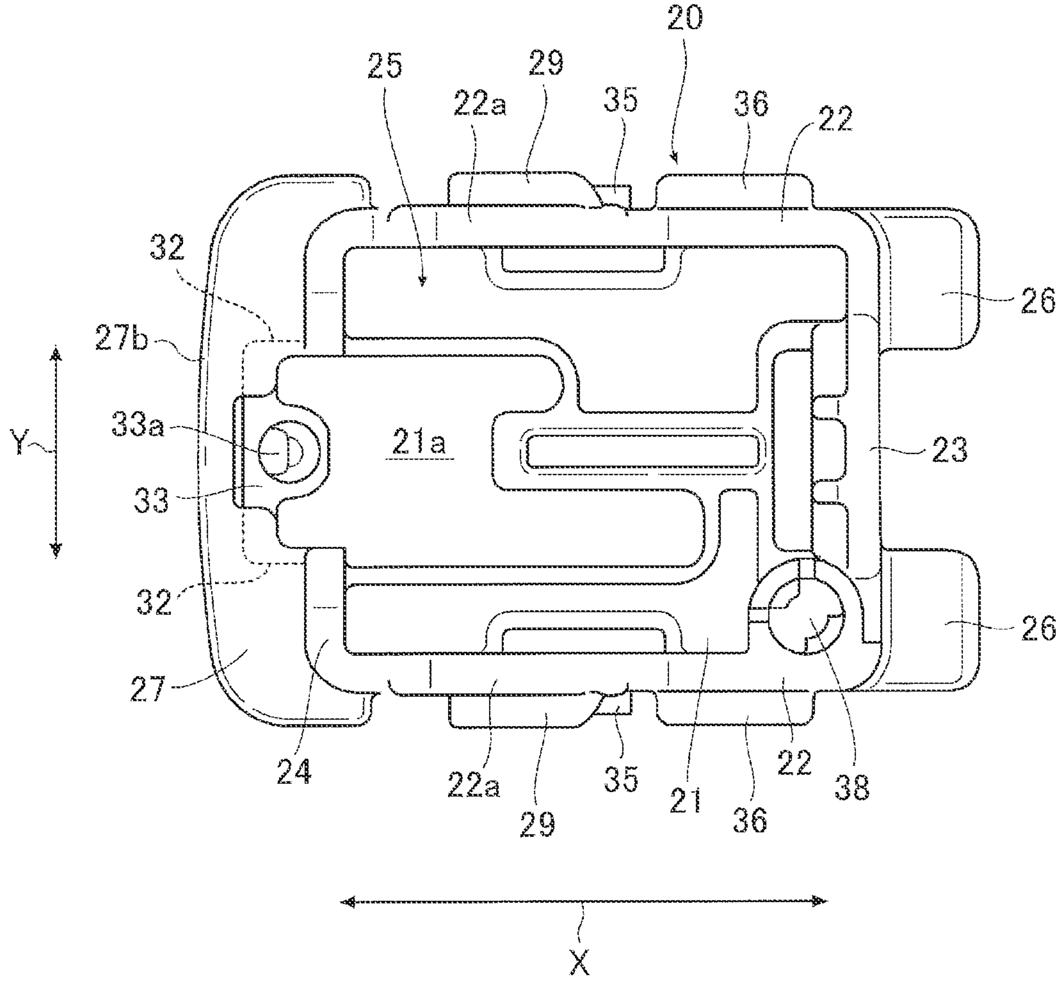
FIG. 6 is a plan view of the base member.

In the present embodiment, as shown in FIGS. 4 to 6, the base member 20 has a substantially elongated box shape having a bottom wall 21 having an elongated plate shape that is long in one direction, a pair of sidewalls 22 and 22 erected from peripheral edges of both sides along long sides of the bottom wall 21, one end wall 23 arranged on one end-side of the bottom wall 21 in the longitudinal direction and connecting the pair of sidewalls 22 and 22 each other, and the other end wall 24 arranged on the other end-side of the bottom wall 21 in the longitudinal direction and connecting the pair of sidewalls 22 and 22 each other, where an upper side opposite to the bottom wall 21 is opened and an internal space 25 is defined therein. Note that, the base member may have, for example, a substantially square box shape as a whole, and the external shape thereof is not particularly limited.

The bottom wall 21 is formed with a slide groove 21*a* configured to slidably accommodate an operating lever 45 (which will be described later) of the operation member 40 and to communicate with the internal space 25. The one end wall 23 is formed with an opening portion 23*a* configured to communicate with the internal space 25.

Note that, one end of the bottom wall 21 in the longitudinal direction is arranged on one end 6*a*-side of the attachment hole 6 in the longitudinal direction, and the other end of the bottom wall 21 in the longitudinal direction is arranged on the other end 6*b*-side of the attachment hole 6 in the longitudinal direction. In the present invention, the "one end-side of the base member" means an end portion-side arranged on one end-side of the attachment hole, and the "other end-side of the base member" means an end portion-side arranged on the other end-side of the attachment hole. In the present embodiment, one end wall 23-side from which a hook 26 (which will be described later) protrudes means the "one end-side of the base member" of the present invention, and the other end wall 24-side on which an elastic engaging claw 30 (which will be described later) is provided means the "other end-side of the base member" of the present invention.

Note that, in descriptions below, as shown in FIG. 6, a direction in which one end and the other end of the base member 20 are arranged is referred to as an end portion arranging direction X (longitudinal direction) of the base member, and a direction orthogonal to the end portion arranging direction X is referred to as a width direction Y of the base member (this has the similar meaning for the bottom wall 21, one end wall 23, the other end wall 24 and the like).

A pair of hooks 26 and 26 protrudes from both sides in the width direction Y on the bottom wall 21-side of one end wall 23. When the base member 20 is obliquely inserted from the front side of the attachment hole 6 so as to attach the base member 20 to the attachment hole 6, the hooks 26 and 26 are hooked to a peripheral edge on a rear side of one end 6*a* of the attachment hole 6 (refer to the dashed-two dotted line in FIG. 9), When the base member 20 is pushed into the attachment hole 6 and the elastic engaging claw 30 (which will be described later) is thus engaged with a peripheral edge on a rear side of the other end 6*b* of the attachment hole 6, the hooks 26 and 26 are hooked to the peripheral edge on the rear side of one end 6*a* of the attachment hole 6 (refer to FIG. 9). The hooks are not necessarily provided in a pair. For example, one hook may protrude from a center of a rear surface of one end wall 23. That is, the hook is not particularly limited.

As shown in FIGS. 5A and 9, the other end-side of the base member 20 is provided with a wall part 27 facing a peripheral edge of the other end 6*b*-side of the attachment hole 6. The wall part 27 is an outer periphery of the other end wall 24 constituting the base member 20, and protrudes from a predetermined height position toward an outside of the base member, thereby forming a thin flange shape. When the base member 20 is attached to the attachment hole 6, a rear surface 27*a* of the wall part 27 facing toward an insertion direction of the base member 20 into the attachment hole 6 is arranged to face and contact a peripheral edge on a front side of the protruding portion 5*a* located on the other end 6*b*-side of the attachment hole 6 (refer to FIGS. 9 and 12). Note that, the wall part 27 extends over an entire range of the other end wall 24 in the width direction Y, and reaches end portions of the pair of sidewalls 22 and 22 close to the other end wall 24 (refer to FIGS. 5A and 5B).

As shown in FIGS. 5A and 5B, the rotation support portions 29 configured to rotationally support the base end portions 41 of the operation member 40 each protrude from outer surfaces of protrusions 22*a* and 22*a* uplifted in a substantially trapezoidal mountain shape at positions close to the other end wall 24 and on upper portions (opposite sides to the bottom wall 21) of the pair of sidewalls 22 and 22. Each rotation support portion 29 is a projection having a substantially circular arc shape.

As shown in FIGS. 5A and 8, elastically deformable elastic engaging claws 30 configured to be engaged with the peripheral edge on the rear side of the attachment hole 5 are provided on the further other end-side of the base member 20 opposite to the one end-side (one end wall 23-side) than the rotation support portions 29. In the present embodiment, the pair of elastic engaging claws 30 and 30 is provided on both sides in the width direction Y of the other end wall 24 constituting the base member 20.

More specifically, as shown in FIG. 5A, concave portions 31 and 31 further recessed toward one end-side of the base member 20 by a predetermined depth than an end face 27*b* of the wall part 27 are formed on both sides of the other end wall 24 in the width direction Y and on the rear surface 27*a*-side of the wall part 27. The concave portions 31 and 31 are further recessed toward one end-side of the base member 20 than the most protruding outer surface 24*a* (refer to FIG. 5A) of the other end wall 24. The elastic engaging claws 30 extend with the concave portions 31 being interposed. That is, the pair of elastic engaging claws 30 and 30 each extends from a surface of the other end wall 24 of the base member 20, on which the concave portions 31 and 31 are formed, and when the elastic engaging claws 30 are bent, the elastic engaging claws 30 and 30 are accommodated in the concave portions 31 and 31.

Each elastic engaging claw 30 has a base end portion 30*a* extending along a plane direction of the bottom wall 21, and extends obliquely outward from a tip end of the base end portion 30*a* in the extension direction toward the wall part 27 (refer to FIG. 5A). A tip end portion 30*b* of each elastic engaging claw 30 has a step shape and is adapted to engage to a peripheral edge on a rear side of the other end 6*b*-side of the attachment hole 6 (refer to FIG. 9).

Note that, in the present embodiment, the elastic engaging claws 30 extend from both sides in the width direction of the other end wall 24 of the base member 20, and are adapted to engage to the peripheral edge on the rear side of the other end 6*b*-side of the attachment hole 6. However, for example, the elastic engaging claw may extend from a position close to the other end of the outer surface of the sidewall 22 of the base member 20, may be provided on the further other end-side than the rotation support portion 29, and may be engaged with the peripheral edge on the rear side of the attachment hole 6.

In the present embodiment, the concave portion has a concave shape further recessed toward one end-side of the base member than the wall part. However, for example, the concave portion may have a concave groove shape recessed from the bottom surface of the base member by a predetermined depth and recessed toward one end-side of the base member (which will be described later), and may have a shape that can accommodate the elastic engaging claw when elastically deformed.

Subsequently, the base member 20 to which the operation member 40 is rotatably attached via the rotation support portions 29 and 29 is described with reference to FIGS. 4, 7 and the like.

The operation member 40 has an elongated shape that is long in one direction as a whole. The operation member 40 has the base end portion 41 that is rotatably supported to the rotation support portions 29 of the base member 20, and a gripping part 42 that is provided at a tip end portion in the longitudinal direction and is gripped by an operator when rotationally operating the operation member 40. Both sides (both sides in the width direction orthogonal to the longitudinal direction) of the base end portion 41 are formed with groove portions 43 and 43 each having a substantially circular arc groove shape. The circular arc protrusion-shaped rotation support portions 29 and 29 of the base member 20 are each inserted into the groove portions 43 and 43, so that the base end portion 41 of the operation member 40 is rotatably supported via the rotation support portions 29.

Figure 14:
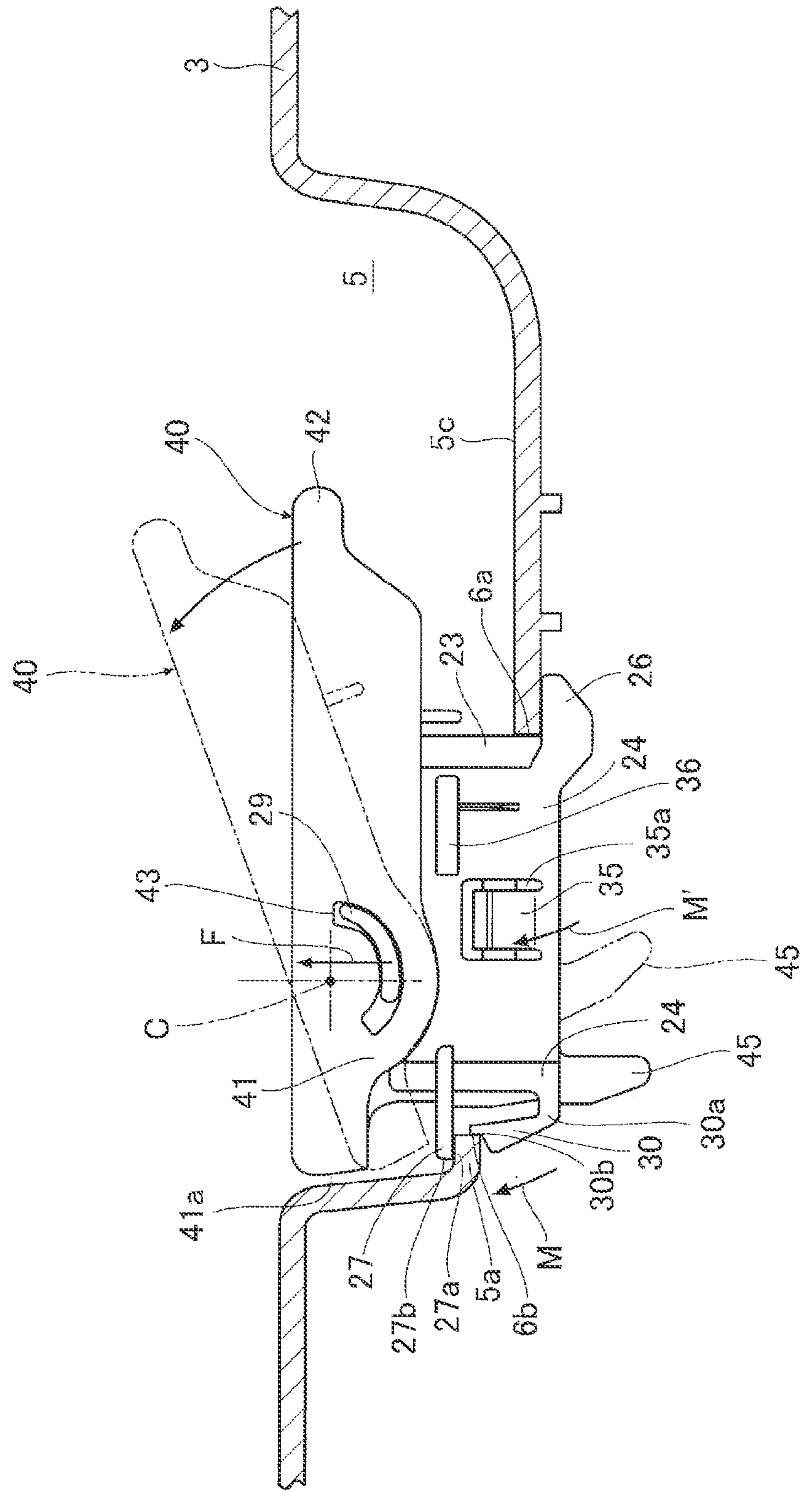
FIG. 14 is a sectional view depicting a rotating state of the operation member in the lock device.

As shown in FIG. 14, the operation member 40 is configured so that the gripping part 42 on the tip end portion-side can be rotated away from or toward the base member 20 about the base end portion 41 as a support point rotationally supported to the rotation support portions 29 of the base member 20. Note that, a center of rotation of the operation member 40 is a place denoted with a reference sign "C" in FIG. 14.

As shown in FIG. 10B, the most protruding end face 41*a* (refer to FIG. 7) in the longitudinal direction on the base end portion 41-side of the operation member 40 is located on a further outer diameter-side of the attachment hole 6 than the protruding end face of the protruding portion 5*a* of the concave portion 5 for accommodation. That is, in a state where the base member 20 is attached to the attachment hole 6 and the operation member 40 is not rotationally operated (a state where the gripping part 42 of the operation member 40 is not rotated in a direction of separating from the base member 20), as shown in FIG. 10B, when the operation member 40 is seen from the front side of the attachment hole 6, an end face 41*a* on the base end portion 41-side of the operation member 40 is located on the further outer diameter-side of the other end 6*b* of the attachment hole 6 in the longitudinal direction than the protruding end face of the protruding portion 5*a* provided to the concave portion 5 for accommodation. In other words, the end face 41*a* on the base end portion 41-side of the operation member 40 is arranged beyond the protruding end face of the protruding portion 5*a* (refer to FIGS. 10B and 12). Note that, in the present embodiment, as shown in FIG. 10B, when the operation member 40 is seen from the front side of the attachment hole 6, both end faces 41*b* and 41*b* along the longitudinal direction close to the base end portion 41 of the operation member 40 are also located on the further outer diameter-side of both sides of the attachment hole 6 in the longitudinal direction than the protruding end faces of the protruding portions 5*b* and 5*b* provided to the concave portion 5 for accommodation (i.e., located beyond the protruding end faces of the protruding portions 5*b* and 5*b*).

In addition, a circular cylinder insertion hole 41*a* is formed at a position close to the base end portion 41 of the operation member 40, and a cylinder arranging tube 44 having a cylindrical shape protrudes from a peripheral edge of a rear surface of the cylinder insertion hole, so that a well-known key cylinder 80 can be inserted and fixed.

Figure 7:
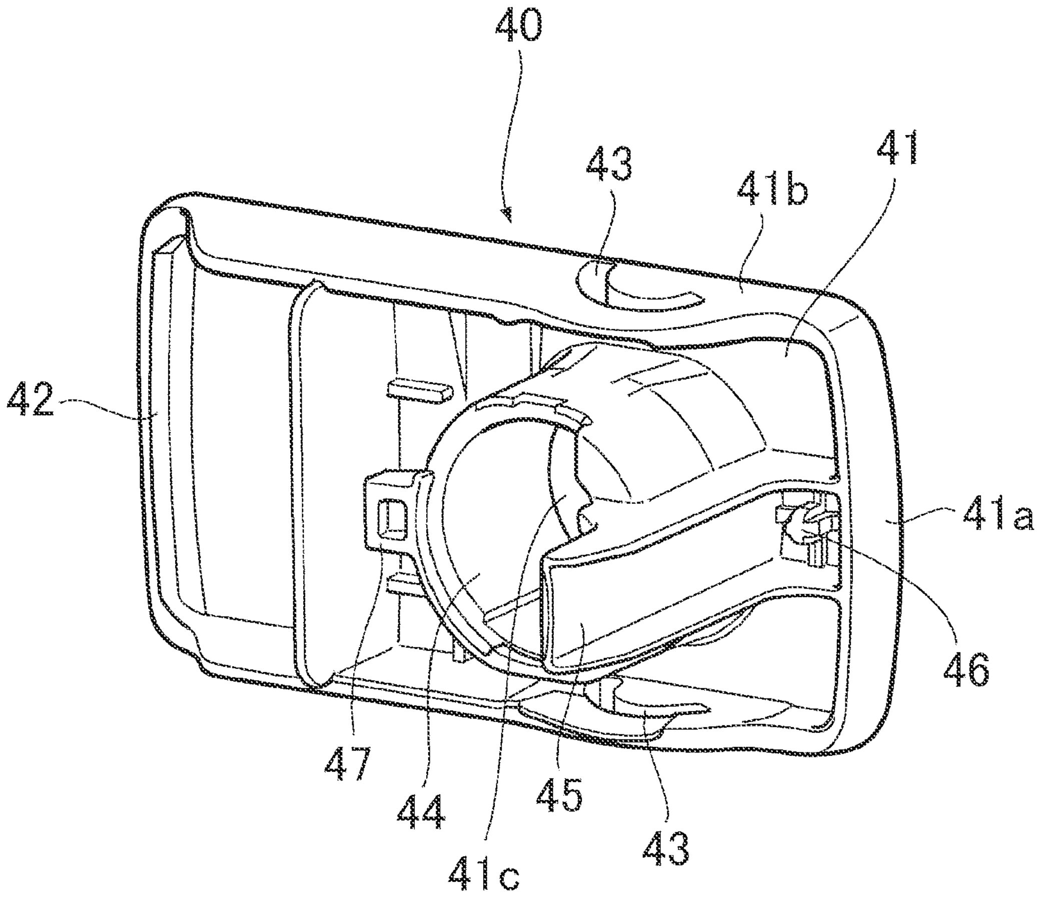
FIG. 7 is an enlarged perspective view of the operation member.
Figure 17:
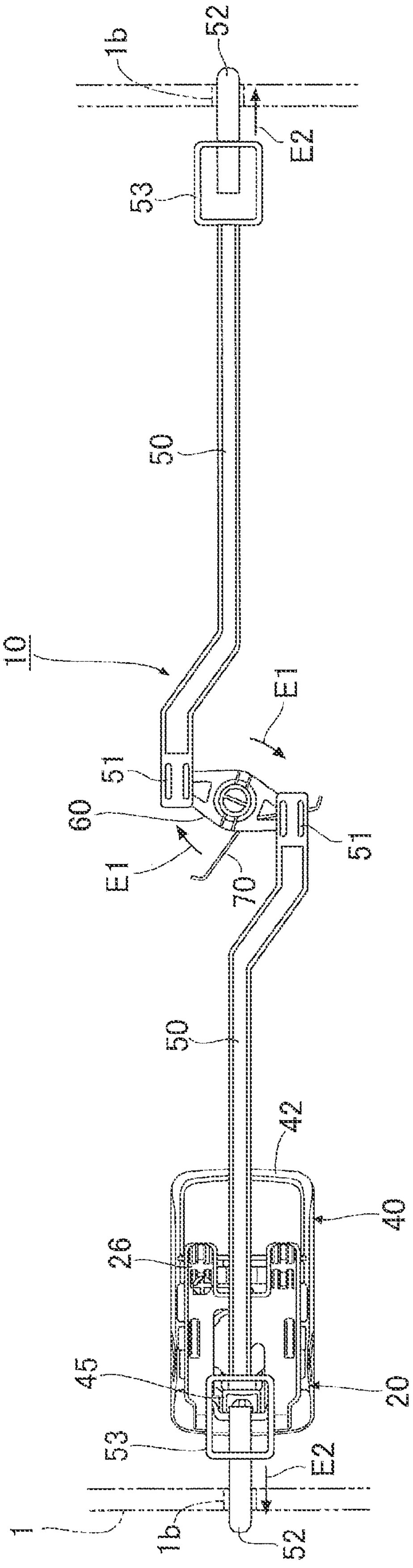
FIG. 17 is a front view depicting the case where the opening and closing body is locked in the closed state in the lock device.

As shown in FIG. 7, an operating lever 45 that causes the tip end portion 52 of the lock member 50 to slide in a direction of not engaging with the lock portion 1*b* of the fixed body 1 when the gripping part 42 of the operation member 40 rotates in a direction of separating from the base member 20 protrudes from a position close to the cylinder arranging tube 44 on the rear surface of the base end portion 41-side of the operation member 40. The operating lever 45 has a substantially U-shaped frame shape in a cross section and extends by a predetermined length. Note that, the operating lever 45 is inserted in the internal space 25 of the base member 20 and is inserted into the slide groove 21*a* formed in the bottom wall 21, so that it can slide in the slide groove 21*a* along the end portion arranging direction X of the base member 20. A tip end portion of the operating lever 45 in the extension direction is inserted from the slide groove 21*a* and enters the frame-shaped part 53 of one lock member 50, as shown in FIG. 17.

As shown with the dashed-two dotted line in FIG. 14 and in FIG. 16, When the gripping part 42 of the operation member 40 is rotated in a direction of separating from the base member 20, the operating lever 45 presses an inner surface of the frame-shaped part 53 of one lock member 50, thereby pulling the tip end portion 52 of one lock member 50 in a direction of not engaging with the lock portion 1*b* against the urging force of the first urging means 70 and pulling the tip end portion 52 of the other lock member 50 in a direction of not engaging with the lock portion 1*b* via the rotary member 60 in association (synchronization) with the pulling. Thereby, the locked state of the opening and closing body 2 that closes the opening portion 1*a* of the fixed body 1 can be released.

Note that, in the present embodiment, when the operation member 40 is rotationally operated as described above, one lock member 50 is slid and the other lock member 50 is slid via the rotary member 60. However, the rotary member 60 may be rotated by the rotation operation of the operation member 40, thereby sliding the lock member 50.

As shown in FIG. 7, a spring support protrusion 46 for supporting one end of the second urging means 75 that is a coil spring protrudes from the furthest base end of the rear surface side of the base end portion 41 of the operation member 40. Also, as shown in FIG. 7, a stopper protrusion 47 protrudes from an opening peripheral edge portion of the cylinder arranging tube 44 on an opposite side to the operating lever 45. When the gripping part 42 of the operation member 40 is rotated in a direction of separating from the base member 20, the stopper protrusion 47 comes into contact with the opening portion 23*a* (refer to FIG. 5B) provided to one end wall 23 of the base member 20, thereby regulating a rotating angle of the gripping part.

Figure 11:
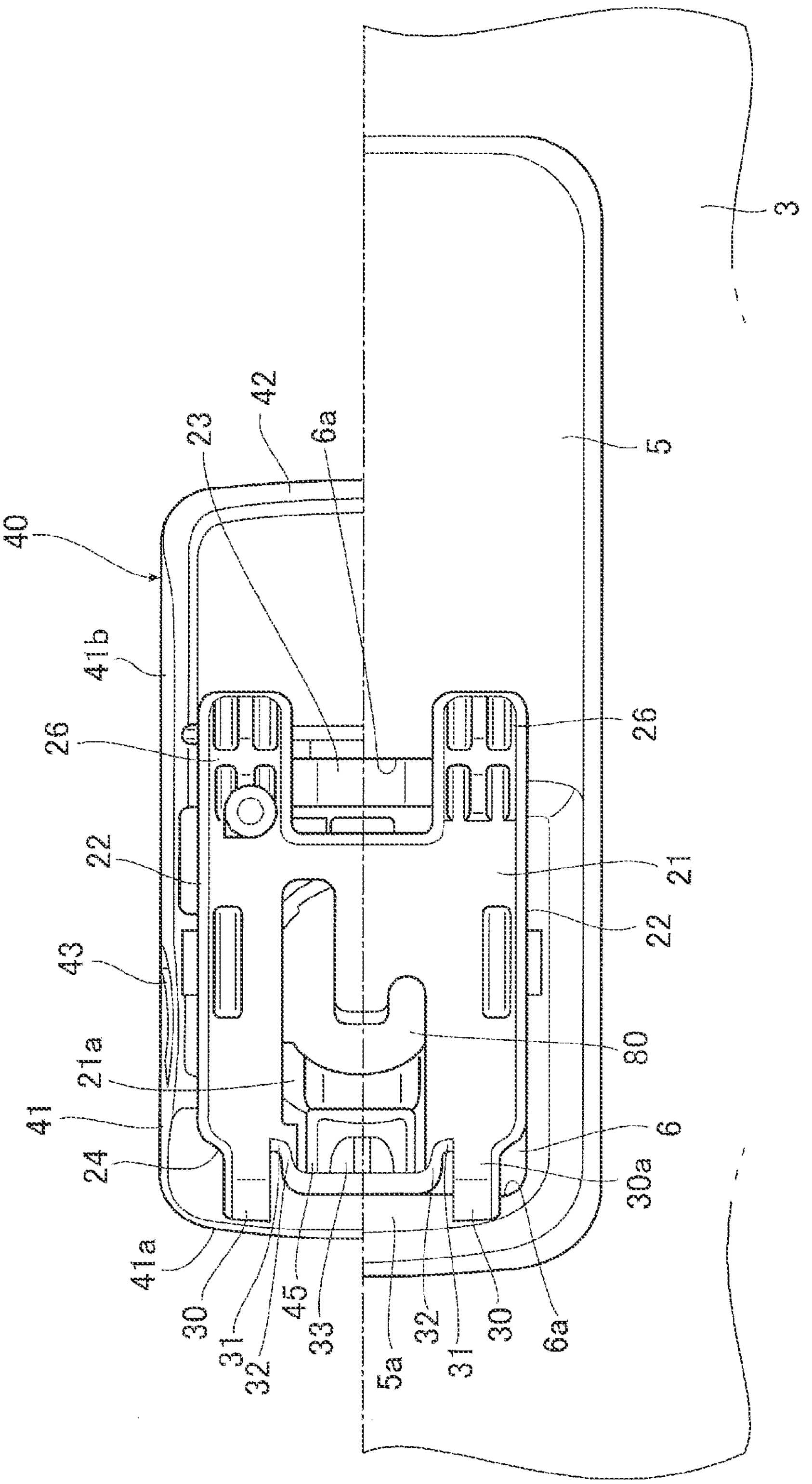
FIG. 11 is a partially broken bottom view depicting a state at the time the base member is attached to the attachment hole in the lock device.

The base member 20 is again described. As described above, the other end wall 24 constituting the base member 20 is formed on both sides in the width direction Y with the concave portions 31 and 31. As shown in FIGS. 8 and 11, the concave portions 31 and 31 are each provided on both sides of the operating lever 45 of the operation member 40. The other end wall 24 of the base member 20 has a pair of sidewall parts 32 and 32 located on the operating lever 45-side of each concave portion 31 (refer to FIG. 11), and inner surfaces of the sidewall parts 32 and 32 at a predetermined height are connected by a spring support portion 33, as shown in FIG. 6.

From the front surface (a surface facing the operation member 40) of the spring support portion 33, a spring support protrusion 33*a* configured to support the other end of the second urging means 75 protrudes. As shown in FIG. 12, the other end of the second urging means 75 is supported by the spring support protrusion 33*a* on the base member 20-side, and one end of the second urging means 75 is supported by the spring support protrusion 46 on the operation member 40-side, so that the second urging means is kept compressed between both the members and the base end portion 41-side of the operation member 40 is rotationally urged in a direction of separating from the base member 20. For this reason, as shown with the dashed-two dotted line in FIG. 14, when the gripping part 42 of the operation member 40 is rotated in a direction of separating from the base member 20 and a hand is then detached from the gripping part 42, the gripping part 42 is urged toward the base member 20 and is held not to protrude from the concave portion 5 for accommodation. The second urging means 75 corresponds to the "urging means" of the present invention. Note that, as shown in FIG. 12, the spring support protrusion 33*a* is located on an inner side of the frame-shaped part of the operating lever 45 having a U-shaped frame shape in a cross section and does not interfere with the slide operation of the operating lever 45, in a state where the operation member 40 is not rotated.

Figure 13:
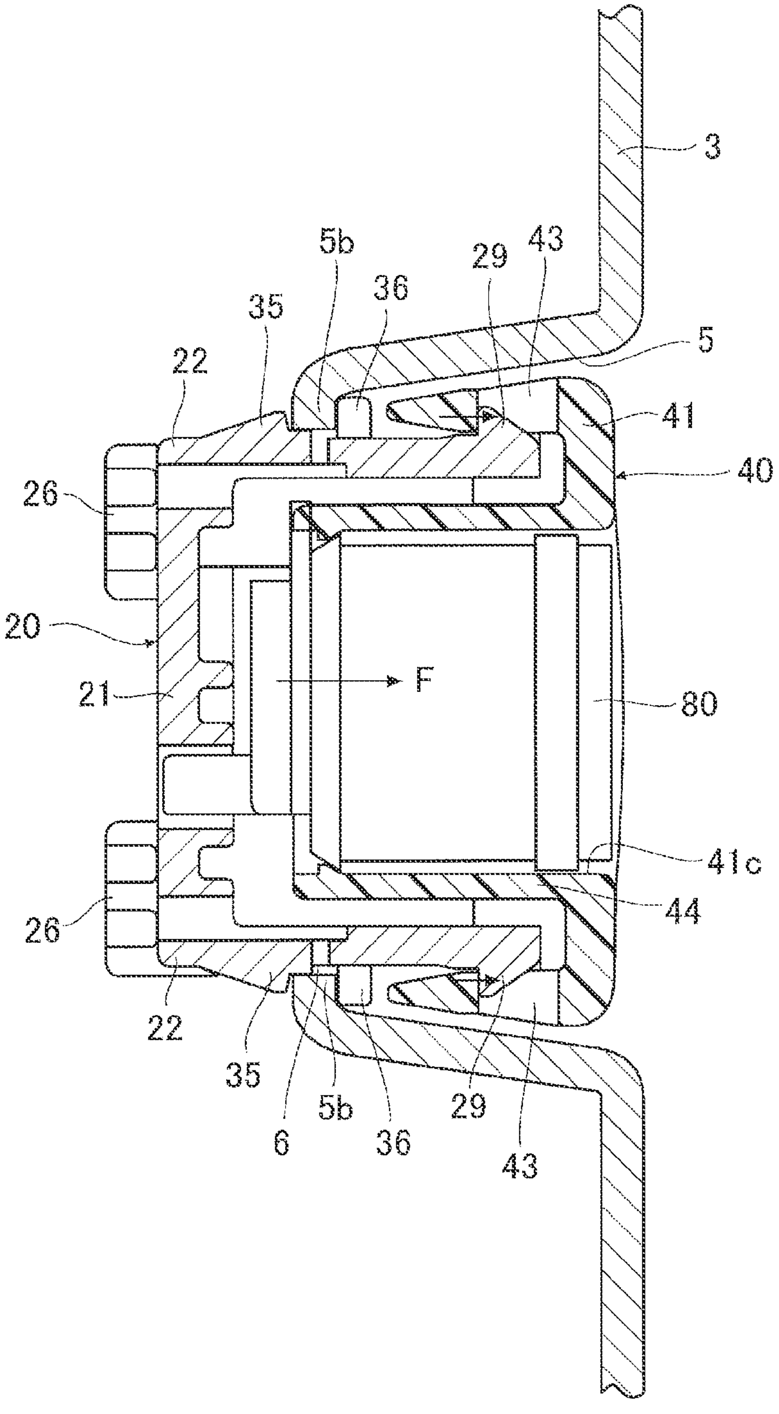
FIG. 13 is a sectional view taken along a B-B arrow of FIG. 10B.

As shown in FIGS. 5A and 14, flexible elastic engaging pieces 35 and 35 are formed via U-shaped slits 35*a* on a further one end wall 23-side than the rotation support portions 29 and 29 on outer surfaces of the sidewalls 22 and 22 of the base member 20. In addition, ribs 36 and 36 protrude at positions close to the elastic engaging pieces 35 and 35 on the outer surfaces of the sidewalls 22 and 22 close to one end wall 23. As shown in FIG. 13, the pair of elastic engaging pieces 35 and 35 is engaged with the rear peripheral edges of both side parts (the protruding portions 5*b* and 5*b*) of the attachment hole 6 in the longitudinal direction, and the pair of ribs 36 and 36 is engaged with the front peripheral edges of both side parts of the attachment hole 6.

As shown in FIGS. 5B and 6, a damper mounting hole 38 is formed at a corner portion on one end-side of the base member 20. As shown in FIG. 4, a rubber damper 39 is mounted to the damper mounting hole 38, so that a hitting sound is reduced when the operation member 40 rotates.

Subsequently, the operational effects of the lock device 10 configured as described above are described.

When attaching the base member 20 to the attachment hole 6 provided to the opening and closing body 2, one end-side (one end wall 23-side) of the base member 20 is first obliquely inserted from the front side of the attachment hole 6 to hook and engage the pair of hooks 26 and 26 to the peripheral edge on the rear side of one end 6*a* of the attachment hole 6, as shown with the dashed-two dotted line in FIG. 9. In this state, as shown with an arrow in FIG. 9, the other end-side (the other end wall 24-side) of the base member 20 is pushed toward the other end 6*b* of the attachment hole 6. That is, the base member 20 is pushed while rotating the same about the hooks 26 as a support point, FIG. 9 depicts an attaching locus K when inserting and attaching the base member 20 into the attachment hole 6.

Then, the tip end portions 30*b* and 30*b* are pressed against the inner peripheral edge of the other end 6*b* of the attachment hole 6 (the protruding end face of the protruding portion 5*b*), so that the pair of elastic engaging claws 30 and 30 is pushed while elastically deforming. When the tip end portions 30*b* and 30*b* get over the rear side of the other end 6*b* of the attachment hole 6, the pair of elastic engaging claws 30 and 30 is elastically returned, so that the tip end portions 30*b* and 30*b* are each engaged with the peripheral edge on the rear side of the other end 6*b* of the attachment hole 6 and the rear surface 27*a* of the wall part 27 comes into contact with the front peripheral edge of the other end 6*b* of the attachment hole 6 (refer to FIG. 9). In addition, the pair of hooks 26 and 26 is each engaged with the peripheral edge on the rear side of one end 6*a* of the attachment hole 6 arranged at a position lower than the other end 6*b* (refer to FIG. 9). Further, as shown in FIG. 13, the pair of elastic engaging pieces 35 and 35 is engaged with the peripheral edges on the rear sides of both sides (the protruding portions 5*b* and 5*b*) of the attachment hole 6 in the longitudinal direction and the pair of ribs 36 and 36 is engaged with the peripheral edges of the front sides of both sides (the protruding portions 5*b* and 5*b*) of the attachment hole 6. In this way, the base member 20 can be attached to the attachment hole 6.

In the lock device 10, when the opening and closing body 2 is closed from a state where the opening and closing body 2 is opened from the opening portion 1*a* of the fixed body 1, the tip end portions 52 and 52 of the pair of lock members 50 and 50 are engaged with the lock portions 1*b* and 1*b* of the fixed body 1, so that the opening and closing body 2 is locked in a closed state (refer to FIGS. 15 and 17).

Figure 18:
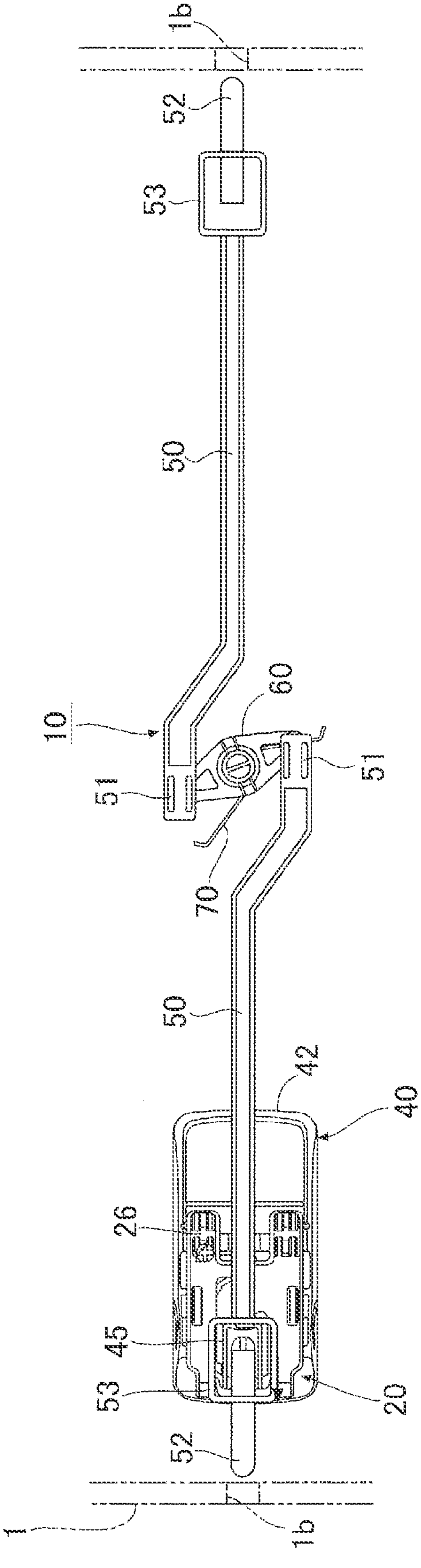
FIG. 18 is a front view depicting the case where the locked state of the opening and closing body is released in the lock device.

From this state, when the gripping part 42 of the operation member 40 is rotated in a direction of separating from the base member 20, as shown with the dashed-two dotted line in FIG. 14 or in FIG. 16, the tip end portion 52 of one lock member 50 is pulled in a direction of not engaging with the lock portion 1*b* against the rotational urging force of the rotary member 60 and the tip end portion 52 of the other lock member 50 is pulled in a direction of not engaging with the lock portion 1*b* via the rotary member 60 in association with the pulling, as shown in FIG. 18. Therefore, the locked state of the opening and closing body 2 is released, so that the opening and closing body 2 can be opened from the opening portion 1*a* of the fixed body 1.

When unlocking the opening and closing body 2 as described above, the gripping part 42 of the operation member 40 is rotated in the direction of separating from the base member 20, as shown in FIG. 14. At this time, a pulling load F of pulling out the base member 20 from the attachment hole 6 is applied to the base member 20 via the operation member 40. That is, as shown in FIG. 13, as the operation member 40 is pulled up, the inner surface of the groove portion 43 presses to lift up the rotation support portion 29 of the base member 20 (refer to an arrow in FIG. 13), so that the pulling load F is applied to the base member 20. At this time, in the lock device 10, as shown in FIGS. 5A and 8, since the elastic engaging claw 30 is provided on the further other end-side than the rotation support portion 29 of the base member 20, the elastic engaging claw 30 can be provided at a position distant from the hook 26.

For this reason, as described above, when the gripping part 42 of the operation member 40 is rotated in the direction of separating from the base member 20, even though the pulling load F is applied to the base member 20 via the rotation support portion 29 and the rotation moment M (refer to FIG. 14) in a pulling direction is applied to the base member 20 with the hook 26 as a support point, it is possible to make it difficult for the elastic engaging claw 30 to be susceptible to the rotation moment M. As a result, the rattling of the elastic engaging claw 30 with respect to the attachment hole 6 is suppressed, so that the base member 20 can be stably attached to the attachment hole 6.

Note that, in a case where the base member 20 is not provided with the elastic engaging claw 30 and only the elastic engaging piece 35 is provided on the further one end-side than the rotation support portion 29 of the base member 20 (for example, a configuration where the elastic engaging claw 30 is omitted in FIG. 14), when the pulling load is applied to the base member 20 via the rotation support portion 29, the rotation moment M' (refer to FIG. 14) in a pulling direction is applied to the base member 20 with the hook 26 as a support point, so that the rotation moment M' is applied to the elastic engaging piece 35 and the elastic engaging piece 35 is likely to rattle.

In the present embodiment, the elastic engaging claw 30 is provided to the base member 20 on the other end 6*b*-side opposite to one end 6*a*-side of the attachment hole 6 so as to be engageable to the peripheral edge on the rear side. For this reason, the elastic engaging claw 30 can be provided at a position further distant from the hook 26, and when the pulling load F is applied to the base member 20 by rotating the gripping part 42 of the operation member 40 in the direction of separating from the base member 20, the rattling of the elastic engaging claw 30 with respect to the attachment hole 6 can be suppressed more effectively.

In addition, as shown in FIGS. 5A, 8 and 9, in the lock device 10 of the present embodiment, the other end-side of the base member 20 is formed with the wall part 27 facing the peripheral edge of the other end 6*b*-side of the attachment hole 6 and the concave portion 31 further recessed toward one end-side of the base member 20 than the wall part 27, and the elastic engaging claw 30 is accommodated in the concave portion 31 when the elastic engaging claw 30 is bent, As described above, the other end-side of the base member 20 is provided with the concave portion 31 in which the elastic engaging claw 30 can be accommodated when elastically deformed. Therefore, when the elastic engaging claw 30 is elastically deformed, the elastic deformation is received in the concave portion 31, so that it is possible to easily secure a bending margin of the elastic engaging claw 30 and to suppress the elastic engaging claw 30 from protruding from the end face 27*b* of the wall part 27. For this reason, when inserting and attaching the base member 20 from the front side of the attachment hole 6, a clearance between the inner periphery of the other end 6*b* of the attachment hole 6 and the outer periphery of the other end of the base member 20 on the attaching locus K (refer to FIG. 9) of the base member 20 can be made as small as possible, so that an appearance can be improved when the base member 20 is seen from the front side of the attachment hole 6.

Note that, in a case where the concave portion 31 is not provided, the elastic engaging claw 30 should be formed to protrude toward an outside of the base member 20 so as to elastically deform the elastic engaging claw 30, and the inner periphery of the other end 6*b* of the attachment hole 6 should be accordingly expanded. As a result, the clearance between the inner periphery of the other end of the attachment hole 6 and the outer periphery of the other end of the base member 20 is increased, which deteriorates the appearance.

As shown in FIGS. 9 and 12, in the present embodiment, the opening and closing body 2 has the concave portion 5 for accommodation for accommodating the operation member 40, the concave portion 5 for accommodation is provided with the protruding portion 5*a* (refer to FIG. 10A) protruding from the inner surface of the operation member 40 located on the base end portion 41-side toward the inner side of the concave portion 5 for accommodation, and the protruding end face of the protruding portion 5*a* forms the inner peripheral edge of the attachment hole. In addition, as shown in FIG. 10B, the end face 41*a* of the base end portion of the operation member 40 located on the elastic engaging claw 30-side is located on the further outer side of the attachment hole 6 than the protruding end face of the protruding portion 5*a*. For this reason, the clearance between the inner periphery of the attachment hole 6 and the outer periphery of the base member 20 is covered by the end face 41*a* of the base end portion of the operation member 40 and the protruding end face of the protruding portion 5*a*, so that the appearance can be further improved.

In the present embodiment, the operation member 40 has the operating lever 45. In addition, as shown in FIGS. 8 and 11, the concave portions 31 are each provided on both sides of the operating lever 45, the base member 20 has the pair of sidewall parts 32 and 32 of the concave portions 31 located on the operating lever 45-side and the spring support portion 33 (refer to FIG. 6) connecting the pair of sidewall parts 32 and 32 each other, and the second urging means 75 for urging the base end portion of the operation member 40 located on the elastic engaging claw 30-side in the direction of separating from the base member 20 is arranged on the spring support portion 33.

That is, both sides of the operating lever 45 are provided with the concave portions 31 and 31, and the second urging means 75 for urging the base end portion of the operation member 40 in the direction of separating from the base member 20 is supported by the spring support portion 33 connecting the pair of sidewall parts 32 and 32 each other, as shown in FIG. 12. Therefore, the urging force of the second urging means 75 can be applied to the operation member 40 in a balanced manner and the rigidity of the spring support portion 33 can be improved by the pair of sidewall parts 32 and 32.

Figure 19:
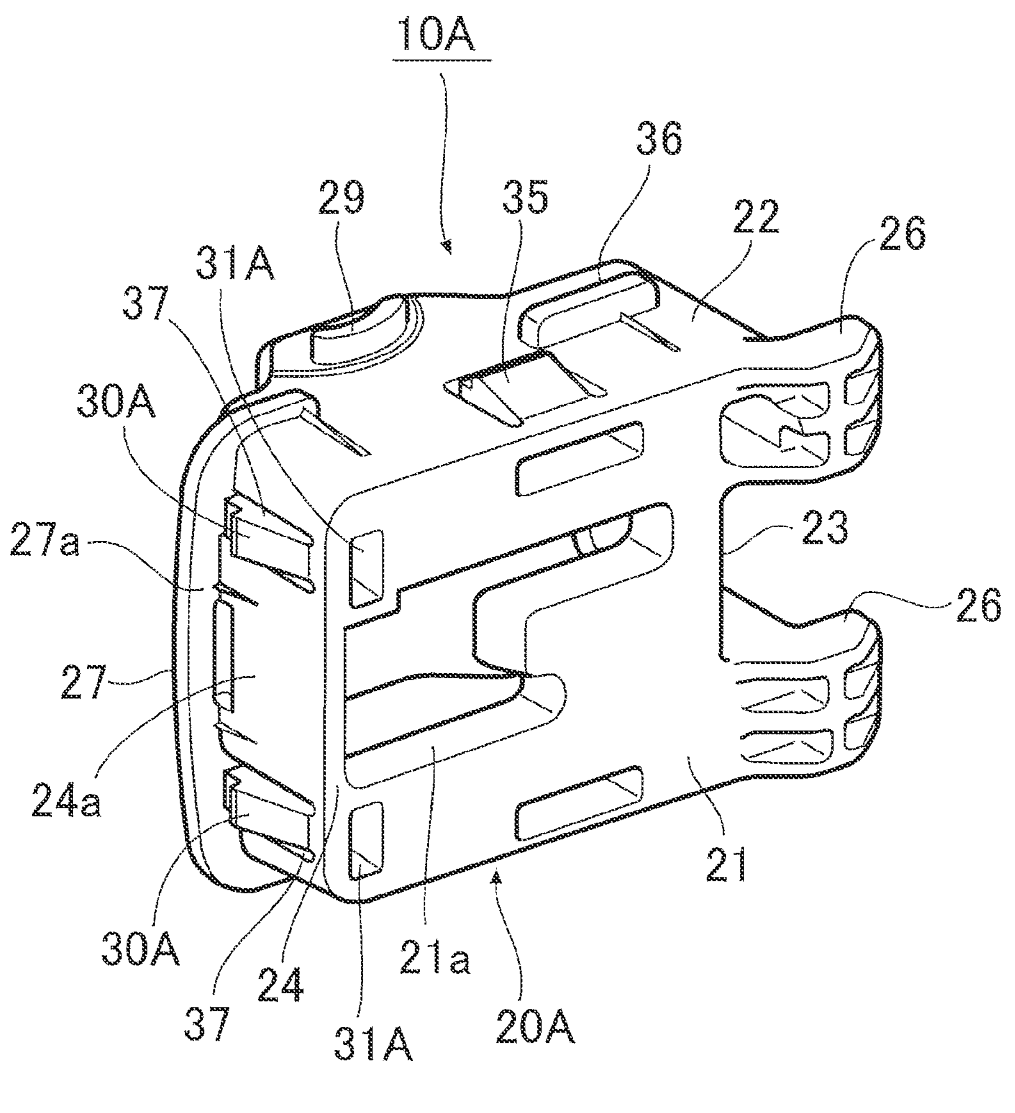
FIG. 19 is an enlarged perspective view of main parts, depicting another embodiment of the lock device for an opening and closing body of the present invention.

FIG. 19 depicts another embodiment of the lock device for an opening and closing body according to the present invention. Note that, the parts that are substantially the same as the above embodiment are denoted with the same reference signs, and the descriptions thereof are omitted.

As shown in FIG. 19, a lock device 10A for an opening and closing body (hereinbelow, "lock device 10A") of the present embodiment is different from the above embodiment, in terms of a shape of a base member 20A.

That is, in the present embodiment, the base member 20A is formed with concave portions 31A and 31A of a predetermined depth each having a concave groove shape, which are recessed in a predetermined depth from the bottom surface-side of both sides of the other end wall 24 in the width direction Y and are further recessed toward one end-side of the base member 20A than the end face 27*b* of the wall part 27. Also, elastic engaging claws 30A, 30A are provided to be elastically deformed via slits 37 each having a substantially U-shape and configured to communicate with the concave portions 31A and 31A. That is, also in the present embodiment, the elastic engaging claw 30A is provided via the concave portion 31A.

When the elastic engaging claws 30A and 30A are pressed against the inner periphery of the attachment hole 6 while inserting and pushing the base member 20 from the front side of the attachment hole 6 so as to attach the base member 20 to the attachment hole 6, the elastic engaging claws are elastically deformed so as to be accommodated in the concave portions 31A and 31A. For this reason, also in the present embodiment, the operational effects similar to the above embodiment can be obtained.

The present invention is not limited to the above embodiments. A variety of modified embodiments can be made within the scope of the gist of the present invention, and such modified embodiments are also included in the scope of the present invention.

REFERENCE SIGNS LIST

1: fixed body
1*a*: opening portion
1*b*: lock portion
2: opening and closing body
5: concave portion for accommodation
5*a*: protruding portion
6: attachment hole
6*a*: one end
6*b*: other end
10, 10A: lock device
20, 20A: base member
23: one end wall
24: other end wall
26: hook
27: wall part
29: rotation support portion
30, 30A: elastic engaging claw
31, 31A: concave portion
40: operation member
41: base end portion
42: gripping part
50: lock member
60: rotary member
75: second urging means (urging means)
80: key cylinder

The invention claimed is:

1. A lock device for an opening and closing body that is attached to an opening portion of a fixed body in an openable and closable manner, the lock device comprising:

a lock portion provided on the opening portion of the fixed body or the opening and closing body;

a lock member configured to operate via an operation member to be engaged with or disengaged from the lock portion;

an attachment hole formed on a front side of the opening and closing body or the fixed body; and a base member inserted and attached from a front side of the attachment hole and including a rotation support portion rotationally supporting the operation member, wherein the operation member includes a base end portion rotationally supported to the rotation support portion and a gripping part provided on a tip end-side, and is configured to slide the lock member in a direction of not engaging with the lock portion by rotating the gripping part in a direction of separating from the base member, one end-side of the base member located on the gripping part-side of the operation member is provided with a hook configured to be engaged with a peripheral edge on a rear side of one end-side of the attachment hole, the base member is provided with elastically deformable elastic engaging claws configured to be engaged with the peripheral edge on the rear side of the attachment hole on a further other end-side opposite to the one end-side than the rotation support portion, each elastic engaging claw is provided to the base member on the other end-side opposite to one end-side of the attachment hole so as to be engaged with a peripheral edge on a rear side of the other end-side, the other end-side of the base member is formed with an other-end wall part including an outer surface facing an inner periphery of the other end-side of the attachment hole and a concave portion further recessed toward one end-side of the base member than the outer surface of the other-end wall part, each elastic engaging claw is received in the concave portion positioned at the one end-side than the other-end wall part when the elastic engaging claw is bent toward the one end-side of the base member than the other-end wall part, the operation member includes an operating lever that causes the lock member to slide in the direction of not engaging with the lock portion when the operation member rotates in the direction of separating from the base member, the concave portion is provided on each of both sides of the operating lever, a pair of sidewall parts which are located on the operating lever side of each of the concave portions are provided at the other end-side of the base member, the sidewall parts are connected to the outer surface of the other-end wall part, and when viewed from the other end-side of the base member, each elastic engaging claw is mounted inside the concave portion.

2. The lock device for an opening and closing body according to claim 1, wherein the opening and closing body has a concave portion for accommodating configured to accommodate the operation member, the concave portion for accommodation is provided with a protruding portion protruding from an inner surface of the operation member located on the base end portion-side toward an inner side of the concave portion for accommodation, and a protruding end face of the protruding portion forms an inner peripheral edge of the attachment hole, and an end face of the base end portion of the operation member is located on a further outer diameter-side of the attachment hole than the protruding end face of the protruding portion.

3. The lock device for an opening and closing body according to claim 1, wherein the base member has a spring support portion connecting the pair of sidewall parts each other, and an urging means for urging the base end portion of the operation member in a direction of separating from the base member is arranged on the spring support portion.

* * * * *